(12) United States Patent
Horowitz et al.

(10) Patent No.: US 11,481,289 B2
(45) Date of Patent: *Oct. 25, 2022

(54) METHOD AND APPARATUS FOR READING AND WRITING COMMITTED DATA

(71) Applicant: MongoDB, Inc., New York, NY (US)

(72) Inventors: Eliot Horowitz, New York, NY (US); Andrew Michalski Schwerin, Brooklyn, NY (US); Mathias Benjamin Stearn, New York, NY (US); Eric Andrew Milkie, Stamford, CT (US)

(73) Assignee: MongoDB, Inc., New York, NY (US)

( * ) Notice: Subject to any disclaimer, the term of this patent is extended or adjusted under 35 U.S.C. 154(b) by 57 days.

This patent is subject to a terminal disclaimer.

(21) Appl. No.: 16/883,653

(22) Filed: May 26, 2020

(65) Prior Publication Data

US 2020/0285549 A1 Sep. 10, 2020

Related U.S. Application Data

(63) Continuation of application No. 15/605,276, filed on May 25, 2017, now Pat. No. 10,671,496.

(Continued)

(51) Int. Cl.
*G06F 11/14* (2006.01)
*G06F 16/23* (2019.01)
*G06F 3/06* (2006.01)

(52) U.S. Cl.
CPC .......... *G06F 11/1474* (2013.01); *G06F 3/061* (2013.01); *G06F 3/065* (2013.01);

(Continued)

(58) Field of Classification Search
None
See application file for complete search history.

(56) References Cited

U.S. PATENT DOCUMENTS 4,918,593 A 4/1990 Huber
5,379,419 A 1/1995 Heffernan et al.
(Continued)

OTHER PUBLICATIONS

[No Author Listed], Automated Administration Tasks (SQL Server Agent). https://docs.microsoft.com/en-us/sql/ssms/agent/automated-adminsitration-tasks-sql-server-agent. 2 pages, [downloaded Mar. 4, 2017].

(Continued)

*Primary Examiner* — Richard L Bowen
(74) *Attorney, Agent, or Firm* — Woll, Greenfield & Sacks, P.C.

(57) ABSTRACT

According to some aspects, a database system comprising a processor configured to execute a plurality of system components is provided. The plurality of system components may include an interface component configured to receive a write commit command and provide a write commit confirmation, a snapshot component configured to generate a plurality of snapshots of data stored in a data storage node of a plurality of data storage nodes and identify a committed snapshot representative of data that has been replicated on a majority of the plurality of data storage nodes, and a command processing component configured to modify a data element based on the write commit command, determine whether the majority of the plurality of storage nodes have replicated the modification using the committed snapshot, and generate the write commit confirmation responsive to a determination that the majority of the plurality of data storage nodes have replicated the modification.

18 Claims, 14 Drawing Sheets

Related U.S. Application Data

(60) Provisional application No. 62/343,494, filed on May 31, 2016.

(52) U.S. Cl.
CPC ............ *G06F 3/067* (2013.01); *G06F 3/0619* (2013.01); *G06F 3/0673* (2013.01); *G06F 11/1451* (2013.01); *G06F 16/2358* (2019.01); *G06F 16/2365* (2019.01); *G06F 16/2379* (2019.01); *G06F 2201/80* (2013.01); *G06F 2201/805* (2013.01); *G06F 2201/82* (2013.01); *G06F 2201/84* (2013.01)

(56) References Cited

U.S. PATENT DOCUMENTS

| | | |
|---|---|---|
| 5,416,917 A | 5/1995 | Adair et al. |
| 5,471,629 A | 11/1995 | Risch |
| 5,551,027 A | 8/1996 | Choy et al. |
| 5,598,559 A | 1/1997 | Chaudhuri |
| 5,710,915 A | 1/1998 | McElhiney |
| 5,884,299 A | 3/1999 | Ramesh et al. |
| 5,999,179 A | 12/1999 | Kekic et al. |
| 6,065,017 A | 5/2000 | Barker |
| 6,088,524 A | 7/2000 | Levy et al. |
| 6,112,201 A | 8/2000 | Wical |
| 6,115,705 A | 9/2000 | Larson |
| 6,212,529 B1 | 4/2001 | Boothby et al. |
| 6,240,406 B1 | 5/2001 | Tannen |
| 6,240,514 B1 | 5/2001 | Inoue et al. |
| 6,249,866 B1 | 6/2001 | Brundett et al. |
| 6,324,540 B1 | 11/2001 | Khanna et al. |
| 6,324,654 B1 | 11/2001 | Wahl et al. |
| 6,339,770 B1 | 1/2002 | Leung et al. |
| 6,351,742 B1 | 2/2002 | Agarwal et al. |
| 6,363,389 B1 | 3/2002 | Lyle et al. |
| 6,385,201 B1 | 5/2002 | Iwata |
| 6,385,604 B1 | 5/2002 | Bakalash et al. |
| 6,427,230 B1 | 7/2002 | Goiffon et al. |
| 6,438,538 B1 | 8/2002 | Goldring |
| 6,496,843 B1 | 12/2002 | Getchius et al. |
| 6,505,187 B1 | 1/2003 | Shatdal |
| 6,611,850 B1 | 8/2003 | Shen |
| 6,687,846 B1 | 2/2004 | Adrangi et al. |
| 6,691,101 B2 | 2/2004 | MacNicol et al. |
| 6,748,393 B1 | 6/2004 | Kapoor et al. |
| 6,801,905 B2 | 10/2004 | Andrei |
| 6,823,474 B2 | 11/2004 | Kampe et al. |
| 6,920,460 B1 | 7/2005 | Srinivasan et al. |
| 6,959,369 B1 | 10/2005 | Ashton et al. |
| 6,973,452 B2 | 12/2005 | Metzger et al. |
| 7,020,649 B2 | 3/2006 | Cochrane et al. |
| 7,032,089 B1 | 4/2006 | Ranade et al. |
| 7,082,473 B2 | 7/2006 | Breitbart et al. |
| 7,177,866 B2 | 2/2007 | Holenstein et al. |
| 7,181,460 B2 | 2/2007 | Coss et al. |
| 7,191,299 B1 | 3/2007 | Kekre et al. |
| 7,246,345 B1 | 7/2007 | Sharma et al. |
| 7,447,807 B1 | 11/2008 | Merry et al. |
| 7,467,103 B1 | 12/2008 | Murray et al. |
| 7,469,253 B2 | 12/2008 | Celis et al. |
| 7,472,117 B2 | 12/2008 | Dettinger et al. |
| 7,486,661 B2 | 2/2009 | Van den Boeck et al. |
| 7,529,834 B1 | 5/2009 | Birrell et al. |
| 7,548,928 B1 | 6/2009 | Dean et al. |
| 7,552,356 B1 | 6/2009 | Waterhouse et al. |
| 7,558,481 B2 | 7/2009 | Jenkins et al. |
| 7,567,991 B2 | 7/2009 | Armangau et al. |
| 7,617,369 B1 | 11/2009 | Bezbaruah et al. |
| 7,634,459 B1 | 12/2009 | Eshet et al. |
| 7,647,329 B1 | 1/2010 | Fischman et al. |
| 7,657,570 B2 | 2/2010 | Wang et al. |
| 7,657,578 B1 | 2/2010 | Karr et al. |
| 7,668,801 B2 | 2/2010 | Koudas et al. |
| 7,761,465 B1 | 7/2010 | Nonaka et al. |
| 7,827,144 B1 * | 11/2010 | Saito ................ G06F 16/2322 707/638 |
| 7,957,284 B2 | 6/2011 | Lu et al. |
| 7,962,458 B2 | 6/2011 | Holenstein et al. |
| 8,005,804 B2 | 8/2011 | Greer |
| 8,005,868 B2 | 8/2011 | Saborit et al. |
| 8,037,059 B2 | 10/2011 | Bestgen et al. |
| 8,078,825 B2 | 12/2011 | Oreland et al. |
| 8,082,265 B2 | 12/2011 | Carlson et al. |
| 8,086,597 B2 | 12/2011 | Balmin et al. |
| 8,099,572 B1 | 1/2012 | Arora et al. |
| 8,103,906 B1 | 1/2012 | Alibakhsh et al. |
| 8,108,443 B2 | 1/2012 | Thusoo |
| 8,126,848 B2 | 2/2012 | Wagner |
| 8,170,984 B2 | 5/2012 | Bakalash et al. |
| 8,185,505 B1 | 5/2012 | Blitzer et al. |
| 8,260,840 B1 | 9/2012 | Sirota et al. |
| 8,296,419 B1 | 10/2012 | Khanna et al. |
| 8,305,999 B2 | 11/2012 | Palanki et al. |
| 8,321,558 B1 | 11/2012 | Sirota et al. |
| 8,352,450 B1 | 1/2013 | Mraz et al. |
| 8,352,463 B2 | 1/2013 | Nayak |
| 8,363,961 B1 | 1/2013 | Avidan et al. |
| 8,370,857 B2 | 2/2013 | Kamii et al. |
| 8,386,463 B2 | 2/2013 | Bestgen et al. |
| 8,392,482 B1 | 3/2013 | McAlister et al. |
| 8,539,197 B1 | 9/2013 | Marshall et al. |
| 8,572,031 B2 | 10/2013 | Merriman et al. |
| 8,589,382 B2 | 11/2013 | Betawadkar-Norwood |
| 8,589,574 B1 | 11/2013 | Cormie et al. |
| 8,615,507 B2 | 12/2013 | Varadarajulu et al. |
| 8,712,044 B2 | 4/2014 | MacMillan et al. |
| 8,712,993 B1 | 4/2014 | Ordonez |
| 8,751,533 B1 | 6/2014 | Dhavale et al. |
| 8,775,070 B1 | 7/2014 | Bhatia |
| 8,843,441 B1 | 9/2014 | Rath et al. |
| 8,869,256 B2 | 10/2014 | Sample |
| 8,996,463 B2 | 3/2015 | Merriman et al. |
| 9,015,431 B2 | 4/2015 | Resch et al. |
| 9,069,827 B1 | 6/2015 | Rath et al. |
| 9,116,862 B1 | 8/2015 | Rath et al. |
| 9,141,814 B1 | 9/2015 | Murray |
| 9,183,254 B1 | 11/2015 | Cole et al. |
| 9,262,462 B2 | 2/2016 | Merriman et al. |
| 9,268,639 B2 | 2/2016 | Leggette et al. |
| 9,274,902 B1 | 3/2016 | Morley et al. |
| 9,313,604 B1 | 4/2016 | Holcombe |
| 9,317,576 B2 | 4/2016 | Merriman et al. |
| 9,350,633 B2 | 5/2016 | Cudak et al. |
| 9,350,681 B1 | 5/2016 | Kitagawa et al. |
| 9,442,995 B2 | 9/2016 | Pareek et al. |
| 9,460,008 B1 | 10/2016 | Leshinsky et al. |
| 9,495,427 B2 | 11/2016 | Abadi et al. |
| 9,569,481 B1 | 2/2017 | Chandra et al. |
| 9,628,404 B1 | 4/2017 | Goffinet et al. |
| 9,660,666 B1 | 5/2017 | Ciarlini et al. |
| 9,715,433 B2 | 7/2017 | Mu et al. |
| 9,740,762 B2 | 8/2017 | Horowitz et al. |
| 9,792,322 B2 | 10/2017 | Merriman et al. |
| 9,800,685 B2 | 10/2017 | Neerincx et al. |
| 9,805,108 B2 | 10/2017 | Merriman et al. |
| 9,881,034 B2 | 1/2018 | Horowitz et al. |
| 9,959,308 B1 | 5/2018 | Carman et al. |
| 10,031,931 B2 | 7/2018 | Horowitz et al. |
| 10,031,956 B2 | 7/2018 | Merriman et al. |
| 10,262,050 B2 | 4/2019 | Bostic et al. |
| 10,303,570 B2 | 5/2019 | Nakajima |
| 10,346,430 B2 | 7/2019 | Horowitz et al. |
| 10,346,434 B1 | 7/2019 | Morkel et al. |
| 10,366,100 B2 | 7/2019 | Horowitz et al. |
| 10,372,926 B1 | 8/2019 | Leshinsky et al. |
| 10,394,822 B2 | 8/2019 | Stearn |
| 10,423,626 B2 | 9/2019 | Stearn et al. |
| 10,430,433 B2 | 10/2019 | Stearn et al. |
| 10,467,245 B2 | 11/2019 | Sirer et al. |
| 10,474,645 B2 | 11/2019 | Freedman et al. |
| 10,489,357 B2 | 11/2019 | Horowitz et al. |
| 10,496,669 B2 | 12/2019 | Merriman et al. |
| 10,614,098 B2 | 4/2020 | Horowitz et al. |

(56) References Cited

U.S. PATENT DOCUMENTS

| | | |
|---|---|---|
| 10,621,050 B2 | 4/2020 | Horowitz et al. |
| 10,621,200 B2 | 4/2020 | Merriman et al. |
| 10,671,496 B2 | 6/2020 | Horowitz et al. |
| 10,673,623 B2 | 6/2020 | Horowitz et al. |
| 10,698,775 B2 | 6/2020 | Horowitz et al. |
| 10,713,275 B2 | 7/2020 | Merriman et al. |
| 10,713,280 B2 | 7/2020 | Horowitz et al. |
| 10,740,353 B2 | 8/2020 | Horowitz et al. |
| 10,740,355 B2 | 8/2020 | Horowitz et al. |
| 10,776,220 B2 | 9/2020 | Horowitz et al. |
| 10,846,305 B2 | 11/2020 | Merriman et al. |
| 10,846,411 B2 | 11/2020 | Horowitz et al. |
| 10,866,868 B2 | 12/2020 | Horowitz |
| 10,872,095 B2 | 12/2020 | Horowitz et al. |
| 10,977,277 B2 | 4/2021 | Merriman et al. |
| 10,990,590 B2 | 4/2021 | Merriman et al. |
| 10,997,211 B2 | 5/2021 | Merriman et al. |
| 11,012,806 B2 | 5/2021 | Tan et al. |
| 11,222,043 B2 | 1/2022 | Horowitz et al. |
| 2001/0021929 A1 | 9/2001 | Lin et al. |
| 2002/0029207 A1 | 3/2002 | Bakalash et al. |
| 2002/0065675 A1 | 5/2002 | Grainger et al. |
| 2002/0065676 A1 | 5/2002 | Grainger et al. |
| 2002/0065677 A1 | 5/2002 | Grainger et al. |
| 2002/0143901 A1 | 10/2002 | Lupo et al. |
| 2002/0147842 A1 | 10/2002 | Breitbart et al. |
| 2002/0184239 A1 | 12/2002 | Mosher, Jr. et al. |
| 2002/0198872 A1 | 12/2002 | MacNicol et al. |
| 2003/0046307 A1 | 3/2003 | Rivette et al. |
| 2003/0212668 A1 | 4/2003 | Hinshaw et al. |
| 2003/0084073 A1 | 5/2003 | Hotti et al. |
| 2003/0088659 A1 | 5/2003 | Susarla et al. |
| 2003/0182427 A1 | 9/2003 | Halpern |
| 2003/0187864 A1 | 10/2003 | McGoveran |
| 2004/0078569 A1 | 4/2004 | Hotti |
| 2004/0133591 A1 | 7/2004 | Holenstein et al. |
| 2004/0168084 A1 | 8/2004 | Owen et al. |
| 2004/0186817 A1 | 9/2004 | Thames et al. |
| 2004/0186826 A1 | 9/2004 | Choi et al. |
| 2004/0205048 A1 | 10/2004 | Pizzo et al. |
| 2004/0220937 A1 | 11/2004 | Bickford et al. |
| 2004/0236743 A1 | 11/2004 | Blaicher et al. |
| 2004/0254919 A1 | 12/2004 | Giuseppini |
| 2005/0027796 A1 | 2/2005 | San Andres et al. |
| 2005/0033756 A1 | 2/2005 | Kottomtharayil et al. |
| 2005/0038833 A1 | 2/2005 | Colrain et al. |
| 2005/0192921 A1 | 9/2005 | Chaudhuri et al. |
| 2005/0216923 A1 | 9/2005 | Krebs |
| 2005/0234841 A1 | 10/2005 | Miao et al. |
| 2005/0283457 A1 | 12/2005 | Sonkin et al. |
| 2006/0004746 A1 | 1/2006 | Angus et al. |
| 2006/0020586 A1 | 1/2006 | Prompt et al. |
| 2006/0085541 A1 | 4/2006 | Cuomo et al. |
| 2006/0090095 A1 | 4/2006 | Massa et al. |
| 2006/0168154 A1 | 7/2006 | Zhang et al. |
| 2006/0209782 A1 | 9/2006 | Miller et al. |
| 2006/0218123 A1 | 9/2006 | Chowdhuri et al. |
| 2006/0224603 A1 | 10/2006 | Correll, Jr. |
| 2006/0235905 A1 | 10/2006 | Kapur |
| 2006/0259160 A1 | 11/2006 | Hood et al. |
| 2006/0287998 A1 | 12/2006 | Folting et al. |
| 2006/0288232 A1 | 12/2006 | Ho et al. |
| 2006/0294129 A1 | 12/2006 | Stanfill et al. |
| 2007/0050436 A1 | 3/2007 | Chen et al. |
| 2007/0061487 A1 | 3/2007 | Moore et al. |
| 2007/0094237 A1 | 4/2007 | Mitchell et al. |
| 2007/0124317 A1 | 5/2007 | Dettinger et al. |
| 2007/0203944 A1 | 8/2007 | Batra et al. |
| 2007/0226640 A1 | 9/2007 | Holbrook et al. |
| 2007/0233746 A1 | 10/2007 | Garbow et al. |
| 2007/0240129 A1 | 10/2007 | Kretzschmar et al. |
| 2008/0002741 A1 | 1/2008 | Maheshwari et al. |
| 2008/0005475 A1 | 1/2008 | Lubbers et al. |
| 2008/0016021 A1 | 1/2008 | Gulbeden et al. |
| 2008/0071755 A1 | 3/2008 | friedman et al. |
| 2008/0098041 A1 | 4/2008 | Chidambaran et al. |
| 2008/0140971 A1 | 6/2008 | Dankel et al. |
| 2008/0162590 A1 | 7/2008 | Kundu et al. |
| 2008/0288646 A1 | 11/2008 | Hasha et al. |
| 2009/0030986 A1 | 1/2009 | Bates |
| 2009/0055350 A1 | 2/2009 | Branish et al. |
| 2009/0077010 A1 | 3/2009 | Muras et al. |
| 2009/0094318 A1 | 4/2009 | Gladwin et al. |
| 2009/0222474 A1 | 9/2009 | Alpern et al. |
| 2009/0240744 A1 | 9/2009 | Thomson et al. |
| 2009/0254572 A1 | 10/2009 | Redlich et al. |
| 2009/0271412 A1 | 10/2009 | Lacapra et al. |
| 2010/0011026 A1 | 1/2010 | Saha et al. |
| 2010/0030793 A1 | 2/2010 | Cooper et al. |
| 2010/0030800 A1 | 2/2010 | Brodfuehrer et al. |
| 2010/0049717 A1 | 2/2010 | Ryan et al. |
| 2010/0057764 A1 | 3/2010 | Williamson |
| 2010/0058010 A1 | 3/2010 | Augenstein et al. |
| 2010/0094851 A1 | 4/2010 | Bent et al. |
| 2010/0106934 A1 | 4/2010 | Calder et al. |
| 2010/0161492 A1 | 6/2010 | Harvey et al. |
| 2010/0198791 A1 | 8/2010 | Wu et al. |
| 2010/0205028 A1 | 8/2010 | Johnson et al. |
| 2010/0223078 A1 | 9/2010 | Willis et al. |
| 2010/0235606 A1 | 9/2010 | Oreland et al. |
| 2010/0250497 A1 | 9/2010 | Redlich et al. |
| 2010/0250930 A1 | 9/2010 | Csaszar et al. |
| 2010/0257142 A1 | 10/2010 | Murphy et al. |
| 2010/0333111 A1 | 12/2010 | Kothamasu |
| 2010/0333116 A1 | 12/2010 | Prahlad et al. |
| 2011/0022642 A1 | 1/2011 | deMilo et al. |
| 2011/0032571 A1 | 2/2011 | Kitada |
| 2011/0125704 A1 | 5/2011 | Mordinova et al. |
| 2011/0125766 A1 | 5/2011 | Carozza |
| 2011/0125894 A1 | 5/2011 | Anderson et al. |
| 2011/0138148 A1 | 6/2011 | Friedman et al. |
| 2011/0202792 A1 | 8/2011 | Atzmony |
| 2011/0225122 A1 | 9/2011 | Denuit et al. |
| 2011/0225123 A1 | 9/2011 | D'Souza et al. |
| 2011/0231447 A1 | 9/2011 | Starkey |
| 2011/0246717 A1 | 10/2011 | Kobayashi et al. |
| 2011/0258225 A1 | 10/2011 | Taylor et al. |
| 2011/0258317 A1 | 10/2011 | Sinha et al. |
| 2011/0295686 A1 | 12/2011 | Martin-Cocher |
| 2011/0307338 A1 | 12/2011 | Carlson |
| 2012/0054155 A1 | 3/2012 | Darcy |
| 2012/0054249 A1 | 3/2012 | Batra et al. |
| 2012/0054755 A1 | 3/2012 | Evans |
| 2012/0076058 A1 | 3/2012 | Padmanabh et al. |
| 2012/0078848 A1 | 3/2012 | Jennas et al. |
| 2012/0078896 A1 | 3/2012 | Nixon et al. |
| 2012/0079224 A1 | 3/2012 | Clayton et al. |
| 2012/0084414 A1 | 4/2012 | Brock et al. |
| 2012/0084789 A1 | 4/2012 | Iorio |
| 2012/0109892 A1 | 5/2012 | Novik et al. |
| 2012/0109935 A1 | 5/2012 | Meijer |
| 2012/0130973 A1 | 5/2012 | Tamm et al. |
| 2012/0130988 A1 | 5/2012 | Nica et al. |
| 2012/0131278 A1 | 5/2012 | Chang et al. |
| 2012/0136835 A1 | 5/2012 | Kosuru et al. |
| 2012/0138671 A1 | 6/2012 | Gaede et al. |
| 2012/0158655 A1 | 6/2012 | Dove et al. |
| 2012/0158949 A1 | 6/2012 | Lee |
| 2012/0159097 A1 | 6/2012 | Jennas, II et al. |
| 2012/0166390 A1 | 6/2012 | Merriman et al. |
| 2012/0166517 A1 | 6/2012 | Lee et al. |
| 2012/0179833 A1 | 7/2012 | Kenrick et al. |
| 2012/0198200 A1 | 8/2012 | Li et al. |
| 2012/0209625 A1 | 8/2012 | Armstrong et al. |
| 2012/0215740 A1 | 8/2012 | Vaillant et al. |
| 2012/0215763 A1 | 8/2012 | Hughes et al. |
| 2012/0221540 A1 | 8/2012 | Rose et al. |
| 2012/0254175 A1 | 10/2012 | Horowitz et al. |
| 2012/0274664 A1 | 11/2012 | Fagnou |
| 2012/0320914 A1 | 12/2012 | Thyni et al. |
| 2013/0019296 A1 | 1/2013 | Brandenburg |
| 2013/0151477 A1 | 6/2013 | Tsaur et al. |
| 2013/0151558 A1 | 6/2013 | Chércoles Sánchez et al. |
| 2013/0179450 A1 | 7/2013 | Chitiveli |

(56) References Cited

U.S. PATENT DOCUMENTS

| | | |
|---|---|---|
| 2013/0290249 A1 | 10/2013 | Merriman et al. |
| 2013/0290471 A1 | 10/2013 | Venkatesh |
| 2013/0332484 A1 | 12/2013 | Gajic |
| 2013/0339379 A1 | 12/2013 | Ferrari et al. |
| 2013/0346366 A1 | 12/2013 | Ananthanarayanan et al. |
| 2014/0013334 A1 | 1/2014 | Bisdikian et al. |
| 2014/0032525 A1 | 1/2014 | Merriman et al. |
| 2014/0032579 A1 | 1/2014 | Merriman et al. |
| 2014/0032628 A1 | 1/2014 | Cudak et al. |
| 2014/0074790 A1 | 3/2014 | Berman et al. |
| 2014/0101100 A1 | 4/2014 | Hu et al. |
| 2014/0164831 A1 | 6/2014 | Merriman et al. |
| 2014/0180723 A1 | 6/2014 | Cote et al. |
| 2014/0201267 A1 | 7/2014 | Yang |
| 2014/0258343 A1 | 9/2014 | Nikula |
| 2014/0279929 A1 | 9/2014 | Gupta et al. |
| 2014/0280380 A1 | 9/2014 | Jagtap et al. |
| 2014/0289197 A1* | 9/2014 | Webber .................. G06F 16/275 707/632 |
| 2015/0012797 A1 | 1/2015 | Leggette et al. |
| 2015/0016300 A1 | 1/2015 | Devireddy et al. |
| 2015/0074041 A1 | 3/2015 | Bhattacharjee et al. |
| 2015/0081766 A1 | 3/2015 | Curtis et al. |
| 2015/0242531 A1 | 8/2015 | Rodniansky |
| 2015/0278295 A1 | 10/2015 | Merriman et al. |
| 2015/0301901 A1 | 10/2015 | Rath et al. |
| 2015/0331755 A1 | 11/2015 | Morgan |
| 2015/0341212 A1 | 11/2015 | Hsiao et al. |
| 2015/0378786 A1 | 12/2015 | Suparna et al. |
| 2015/0378825 A1 | 12/2015 | Resch |
| 2016/0005423 A1 | 1/2016 | Neppalli et al. |
| 2016/0042008 A1 | 2/2016 | Tripathy et al. |
| 2016/0048345 A1 | 2/2016 | Vijayrao et al. |
| 2016/0110284 A1 | 4/2016 | Athalye et al. |
| 2016/0110414 A1 | 4/2016 | Park et al. |
| 2016/0162354 A1 | 6/2016 | Singhai et al. |
| 2016/0162374 A1 | 6/2016 | Mutha et al. |
| 2016/0188377 A1 | 6/2016 | Thimmappa et al. |
| 2016/0198044 A1 | 7/2016 | Gruchala et al. |
| 2016/0203202 A1 | 7/2016 | Merriman et al. |
| 2016/0246861 A1 | 8/2016 | Merriman et al. |
| 2016/0253109 A1 | 9/2016 | Litke et al. |
| 2016/0306709 A1 | 10/2016 | Shaull |
| 2016/0323378 A1 | 11/2016 | Coskun et al. |
| 2016/0364440 A1 | 12/2016 | Lee et al. |
| 2017/0032007 A1 | 2/2017 | Merriman |
| 2017/0032010 A1 | 2/2017 | Merriman |
| 2017/0091327 A1 | 3/2017 | Bostic et al. |
| 2017/0109398 A1 | 4/2017 | Stearn |
| 2017/0109399 A1 | 4/2017 | Stearn et al. |
| 2017/0109421 A1 | 4/2017 | Stearn et al. |
| 2017/0169059 A1 | 6/2017 | Horowitz et al. |
| 2017/0177658 A1 | 6/2017 | Lee et al. |
| 2017/0262516 A1 | 9/2017 | Horowitz et al. |
| 2017/0262517 A1 | 9/2017 | Horowitz et al. |
| 2017/0262519 A1 | 9/2017 | Horowitz et al. |
| 2017/0262638 A1 | 9/2017 | Horowitz et al. |
| 2017/0264432 A1 | 9/2017 | Horowitz et al. |
| 2017/0270176 A1 | 9/2017 | Horowitz et al. |
| 2017/0286510 A1 | 10/2017 | Horowitz et al. |
| 2017/0286516 A1 | 10/2017 | Horowitz et al. |
| 2017/0286517 A1 | 10/2017 | Horowitz et al. |
| 2017/0286518 A1 | 10/2017 | Horowitz et al. |
| 2017/0322954 A1 | 11/2017 | Horowitz et al. |
| 2017/0322996 A1 | 11/2017 | Horowitz et al. |
| 2017/0344290 A1 | 11/2017 | Horowitz et al. |
| 2017/0344441 A1 | 11/2017 | Horowitz et al. |
| 2017/0344618 A1 | 11/2017 | Horowitz et al. |
| 2017/0371750 A1 | 12/2017 | Horowitz et al. |
| 2017/0371968 A1 | 12/2017 | Horowitz et al. |
| 2018/0004801 A1 | 1/2018 | Burchall et al. |
| 2018/0004804 A1 | 1/2018 | Merriman et al. |
| 2018/0095852 A1 | 4/2018 | Keremane et al. |
| 2018/0096045 A1 | 4/2018 | Merriman et al. |
| 2018/0096066 A1 | 4/2018 | Venkataramanappa et al. |
| 2018/0150230 A1* | 5/2018 | Schreter .................. G06F 11/16 |
| 2018/0165338 A1 | 6/2018 | Kumar et al. |
| 2018/0173745 A1 | 6/2018 | Balasubramanian et al. |
| 2018/0176300 A1* | 6/2018 | Chen .................. H04L 41/0893 |
| 2018/0300203 A1 | 10/2018 | Kathpal et al. |
| 2018/0300209 A1 | 10/2018 | Rahut |
| 2018/0300381 A1 | 10/2018 | Horowitz et al. |
| 2018/0300385 A1 | 10/2018 | Merriman et al. |
| 2018/0314750 A1 | 11/2018 | Merriman et al. |
| 2018/0343131 A1 | 11/2018 | George et al. |
| 2018/0365114 A1 | 12/2018 | Horowitz |
| 2019/0102410 A1 | 4/2019 | Horowitz et al. |
| 2019/0303382 A1 | 10/2019 | Bostic et al. |
| 2020/0097486 A1 | 3/2020 | Horowitz et al. |
| 2020/0099392 A1 | 3/2020 | Hecker et al. |
| 2020/0160297 A1 | 5/2020 | Munk |
| 2020/0285549 A1 | 9/2020 | Horowitz et al. |
| 2020/0295925 A1 | 9/2020 | Horowitz et al. |
| 2020/0327021 A1 | 10/2020 | Horowitz et al. |
| 2020/0341867 A1 | 10/2020 | Horowitz et al. |
| 2020/0409804 A1 | 12/2020 | Horowitz et al. |

OTHER PUBLICATIONS

Chang et al., Bigtable: a distributed storage system for structured data. OSDI'06: Seventh Symposium on Operating System Design and Implementation. Nov. 2006.

Cooper et al., PNUTS: Yahoo!'s hosted data serving platform. VLDB Endowment. Aug. 2008.

Decandia et al., Dynamo: Amazon's highly available key-value store. SOSP 2007. Oct. 2004.

Nelson et al., Automate MongoDB with MMS. PowerPoint Presentation. Published Jul. 24, 2014. 27 slides. http://www.slideshare.net/mongodb/mms-automation-mongo-db-world.

Ongaro et al., In Search of an Understandable Consensus Algorithm. Proceedings of USENIX ATC '14: 2014 USENIX Annual Technical Conference. Philadelphia, PA. Jun. 19-20, 2014; pp. 305-320.

Poder, Oracle living books. 2009. <http://tech.e2sn.com/oracle/sql/oracle-execution-plan-operation-reference>.

Stirman, Run MongoDB with Confidence using MMS. PowerPoint Presentation. Published Oct. 6, 2014. 34 slides. http://www.slideshare.net/mongodb/mongo-db-boston-run-mongodb-with-mms-20141001.

Van Renesse et al., Chain replication for supporting high throughput and availability. OSDI. 2004: 91-104.

Walsh et al., Xproc: An XML Pipeline Language. May 11, 2011. <https://www.w3.org/TR/xproc/>.

Wikipedia, Dataflow programming. Oct. 2011. <http://en.wikipedia.org/wiki/Dataflow_programming>.

Wikipedia, Pipeline (Unix). Sep. 2011. <http://en.wikipedia.org/wiki/Pipeline (Unix)>.

Wilkins et al., Migrate DB2 applications to a partitioned database. developerWorks, IBM. Apr. 24, 2008, 33 pages.

\* cited by examiner

| Snapshot View 1302 | Operative Log View 1304 |
|---|---|
| Snapshot_5-10-15_1000 | Create VEGETABLE collection |
| Snapshot_5-10-15_1001 | Insert CARROT into VEGETABLE collection<br>Insert BROCCOLI into VEGETABLE collection |
| Snapshot_5-10-15_1002 | Insert TOMATO into VEGETABLE collection<br>Remove TOMATO from VEGETABLE collection<br>Create FRUIT collection<br>Insert TOMATO into FRUIT collection |
| | Insert BANANA into FRUIT collection<br>Insert APPLE into FRUIT collection |

FIG. 13

METHOD AND APPARATUS FOR READING AND WRITING COMMITTED DATA

RELATED APPLICATIONS

This Application is a continuation of U.S. application Ser. No. 15/605,276, entitled "METHOD AND APPARATUS FOR READING AND WRITING COMMITTED DATA" filed May 25, 2017, which claims priority under 35 U.S.C. § 119(e) to U.S. Provisional Application Ser. No. 62/343,494, entitled "METHOD AND APPARATUS FOR READING AND WRITING COMMITTED DATA" filed on May 31, 2016, which is herein incorporated by reference in its entirety.

BACKGROUND

Databases may include multiple disks to store redundant data. The redundant storage of data in multiple disks may improve the rate at which data can be read from the database by spreading out read requests over multiple disks or systems. Further, the redundant storage of data may improve uptime of the database by making the database more robust to failures.

SUMMARY

According to some aspects, systems and methods are provided to read and write commit data in a database that redundantly stores data. Committed data may include, for example, data that has been written to at least a predetermined number of storage devices in the database. In some embodiments, the system may identify committed data within the database and process certain read requests (e.g., read commit requests) by reading the identified committed data. Thereby, the database may provide an indication of what data has been replicated on at least a certain number of storage devices in the database. Further, the system may allow certain write requests (e.g., write commit requests) that provide a confirmation once the particular changes in the write request have been replicated on at least a predetermined number of storage devices in the database.

According to at least one aspect, a database system is provided. The database system includes at least one processor configured to execute a plurality of system components. The plurality of system components may include an interface component configured to receive a read commit command and provide a result, a snapshot component configured to generate a plurality of snapshots of data stored in a first data storage node of a plurality of data storage nodes and identify a committed snapshot representative of data that has been replicated on a majority of the plurality of data storage nodes, and a command processing component configured to read the committed snapshot responsive to receipt of the read commit command and generate the result using the committed snapshot.

In one embodiment, each snapshot of the plurality of snapshots on a first storage node corresponds to the data stored in the first storage node of the plurality of data storage nodes at unique point in time. In one embodiment, the interface is further configured to receive a confirmation from a second data storage node of the plurality of data storage nodes that the second data storage node has replicated data from the first data storage node. In one embodiment, the snapshot component is further configured to identify a new committed snapshot responsive to receipt of the confirmation from the second data storage node. In one embodiment, the snapshot component is further configured to remove at least one snapshot from the plurality of snapshots responsive to receipt of the confirmation from the second data storage node and, for example, determination that a newer committed snapshot exists.

In one embodiment, the snapshot component is further configured to generate a new snapshot of the data stored in the first data storage node over time, for example, periodically. In one embodiment, the snapshot component is further configured to generate the new snapshot of the data stored in the first data storage node every 10 milliseconds (ms).

In one embodiment, the interface is further configured to receive a read command. In one embodiment, the command processing component is further configured to read data stored in a second data storage node of the plurality of data storage nodes responsive to receiving the read command.

In one embodiment, the command processing component is configured to read the committed snapshot at least in part by identifying a second data storage node that stores data consistent with committed snapshot and reading from the identified second data storage node. In one embodiment, the interface is further configured to receive a write commit command. In one embodiment, the command processing component is further configured write data to the first data storage node, determine whether a majority of the data storage nodes in the plurality of data storage nodes have replicated the data written to the first data storage node, and generate a write commit confirmation responsive to receipt of the write commit command. In one embodiment, the interface component is further configured to provide the write commit confirmation.

In one embodiment, the interface component is further configured to receive a write command. In one embodiment, the command processing component is further configured to write data to the first data storage node responsive to receipt of the write command.

In one embodiment, the system further includes a database including the plurality of data storage nodes. In one embodiment, the database follows an eventual consistency model. In one embodiment, the first data storage node is a primary data storage node and a remainder of the data storage nodes of the plurality of data storage nodes are secondary data storage nodes. In one embodiment, the first data storage node includes an operation log and a remainder of the data storage nodes of the plurality of data storage nodes are configured to retrieve the operation log and replicate operations in the operation log.

According to at least one aspect, a method of performing operations in a computer database is provided. The method includes receiving, by an interface component executed by at least one processor, a read commit command, generating, by a snapshot component executed by the at least one processor, a plurality of snapshots of data stored in a first data storage node of a plurality of data storage nodes and identify a committed snapshot representative of data that has been replicated on a majority of the plurality of data storage nodes, reading, by a command processing component executed by the at least one processor, the committed snapshot responsive to receipt of the read commit command, generating, by the command processing component, generate a result to the read commit command, and providing, by the interface component, the result.

In one embodiment, each snapshot of the plurality of snapshots on a first storage node corresponds to the data stored in the first storage node of the plurality of data storage nodes at unique point in time. In one embodiment, the method further includes receiving a confirmation from a second data storage node of the plurality of data storage nodes that the second data storage node has replicated data from the first data storage node. In one embodiment, the method further includes identifying a new committed snapshot from the plurality of snapshots responsive to receipt of the confirmation from the second data storage node. In one embodiment, the method further includes removing at least one snapshot from the plurality of snapshots responsive to receipt of the confirmation from the second data storage node.

In one embodiment, the method further includes generating new snapshots of the data stored in the first data storage node periodically. In one embodiment, the method further includes generating the new snapshots of the data stored in the first data storage node includes generate the new snapshots of the data stored in the first data storage node every 10 milliseconds.

In one embodiment, the method further includes receiving a read command. In one embodiment, the method further includes reading data stored in a second data storage node of the plurality of data storage nodes responsive to receiving the read command.

In one embodiment, reading the committed snapshot includes identifying a second data storage node that stores data consistent with committed snapshot and reading from the identified second data storage node. In one embodiment, the method further includes receiving a write commit command. In one embodiment, the method further includes writing data to the first data storage node, determining whether a majority of the data storage nodes in the plurality of data storage nodes have replicated the data written to the first data storage node, and generating a write commit confirmation responsive to receipt of the write commit command. In one embodiment, the method further includes providing the write commit confirmation.

In one embodiment, the method further includes receiving a write command. In one embodiment, the method further includes writing data to the first data storage node responsive to receipt of the write command.

In one embodiment, the plurality of data storage nodes are organized in a database. In one embodiment, the database follows an eventual consistency model. In one embodiment, the first data storage node is a primary data storage node and a remainder of the data storage nodes of the plurality of data storage nodes are secondary data storage nodes. In one embodiment, the first data storage node includes an operation log and a remainder of the data storage nodes of the plurality of data storage nodes are configured to retrieve the operation log and replicate operations in the operation log.

According to at least one aspect, a non-transitory computer readable medium comprising instructions consistent with any methods and/or combination of methods described or claimed herein.

According to at least one aspect, a database system is provided. The database system includes a database comprising a plurality of data storage nodes, the plurality of data storage nodes including a primary storage node and a plurality of secondary storage nodes and at least one processor configured to execute a plurality of system components. The plurality of system components may include an interface component configured to receive a read commit command and provide a result, a snapshot component configured to generate a plurality of snapshots of data stored in a secondary data storage node of the plurality of secondary storage nodes and identify a committed snapshot representative of data that has been replicated on a majority of the plurality of data storage nodes, and a command processing component configured to read the committed snapshot responsive to receipt of the read commit command and generate the result.

In one embodiment, the plurality of snapshots are stored in one or more of the plurality of data storage nodes. For example, the plurality of snapshots may be stored in a primary data storage node and/or a secondary data storage node.

According to at least one aspect, a database system is provided. The database system comprises at least one processor configured to execute a plurality of system components. The plurality of system components comprises an interface component configured to receive a read commit command and provide a result; a snapshot component configured to generate a plurality of snapshots of data stored in a first data storage node of a plurality of data storage nodes and identify a committed snapshot from the plurality of snapshots that is representative of data that has been replicated on a majority of the plurality of data storage nodes; and a command processing component configured to read the committed snapshot responsive to receipt of the read commit command and generate the result using the committed snapshot.

In some embodiments, each snapshot of the plurality of snapshots corresponds to data stored in the first storage node at a unique point in time. In some embodiments, the interface component is further configured to receive at least one confirmation from at least one data storage node of the plurality of data storage nodes that the at least one data storage node has replicated data from the first data storage node. In some embodiments, the snapshot component is further configured to identify a new committed snapshot responsive to receipt of the at least one confirmation from the at least one data storage node. In some embodiments, the snapshot component is further configured to remove at least one snapshot from the plurality of snapshots responsive to receipt of the at least one confirmation from the at least one data storage node.

In some embodiments, the snapshot component is further configured to generate a new snapshot of the data stored in the first data storage node periodically. In some embodiments, the snapshot component is further configured to generate the new snapshot of the data stored in the first data storage node every 10 milliseconds.

In some embodiments, the interface is further configured to receive a read command. In some embodiments, the command processing component is further configured to read data stored in a second data storage node of the plurality of data storage nodes responsive to receiving the read command.

In some embodiments, the command processing component is configured to read the committed snapshot at least in part by identifying a data storage node from the plurality of data storage nodes that stores data consistent with committed snapshot and reading from the identified data storage node.

In some embodiments, the system further comprises a database including the plurality of data storage nodes and wherein the database follows an eventual consistency model. In some embodiments, the first data storage node is a primary data storage node and a remainder of the data storage nodes of the plurality of data storage nodes are secondary data storage nodes. In some embodiments, the first data storage node includes an operation log and a remainder of the data storage nodes of the plurality of data storage nodes are configured to retrieve the operation log and replicate operations in the operation log.

According to at least one aspect, a method of performing operations in a computer database. The method comprises receiving, by an interface component executed by at least one processor, a read commit command; generating, by a snapshot component executed by the at least one processor, a plurality of snapshots of data stored in a first data storage node of a plurality of data storage nodes; identifying, by the snapshot component executed by the at least one processor, a committed snapshot from the plurality of snapshots that is representative of data that has been replicated on a majority of the plurality of data storage nodes; reading, by a command processing component executed by the at least one processor, the committed snapshot responsive to receipt of the read commit command; generating, by the command processing component, a result to the read commit command using the committed snapshot; and providing, by the interface component, the result.

In some embodiments, each snapshot of the plurality of snapshots corresponds to the data stored in the first storage node of the plurality of data storage nodes at unique point in time. In some embodiments, the method further comprises receiving at least one confirmation from at least one data storage node of the plurality of data storage nodes that the at least one data storage node has replicated data from the first data storage node. In some embodiments, the method further comprises identifying a new committed snapshot from the plurality of snapshots responsive to receipt of the at least one confirmation from the at least one data storage node. In some embodiments, the method further comprises removing at least one snapshot from the plurality of snapshots responsive to receipt of the at least one confirmation from the at least one data storage node.

In some embodiments, the method further comprises generating new snapshots of the data stored in the first data storage node periodically.

According to at least one aspect, a database system is provided. The database system comprises a database configured to follow an eventual consistency model and comprising a primary data storage node storing an operation log and a plurality of secondary data storage nodes configured to retrieve the operation log from the primary data storage node and replicate operations in the operation log; and at least one processor coupled to the database and configured to execute a plurality of system components. The plurality of system components comprises an interface component configured to receive a read commit command and provide a result; a snapshot component configured to generate a plurality of snapshots of data stored in the primary data storage node where each snapshot corresponds to data stored in the first storage node at a unique point in time and identify a committed snapshot from the plurality of snapshots that is representative of data that has been replicated on a majority of the plurality of secondary data storage nodes; and a command processing component configured to read the committed snapshot responsive to receipt of the read commit command and generate the result using the committed snapshot.

According to at least one aspect, a database system is provided. The database system comprises at least one processor configured to execute a plurality of system components, wherein the plurality of system components comprises an interface component configured to receive a write commit command and provide a write commit confirmation; a snapshot component configured to generate a plurality of snapshots of data stored in a first data storage node of a plurality of data storage nodes and identify a first snapshot from the plurality of snapshots that is representative of data that has been replicated on a majority of the plurality of data storage nodes as a committed snapshot; and a command processing component configured to: determine whether the write commit command modifies at least one data element in the first data storage node; and responsive to the write commit command modifying the at least one data element in the first data storage node, modify the at least one data element in the first data storage node based on the write commit command; determine whether the majority of the plurality of storage nodes have replicated the modification to the at least one data element using the committed snapshot; and generate the write commit confirmation responsive to a determination that the majority of the plurality of data storage nodes have replicated the modification to the at least one data element.

In some embodiments, the command processing component is further configured to generate the write commit confirmation responsive to the write commit command not modifying the at least one data element in the first data storage node. In some embodiments, the command processing component is further to send a command to at least one data storage node in the plurality of data storage nodes to replicate the modification of the at least one data element in the first data storage node responsive to modifying the at least one data element in the first data storage node.

In some embodiments, the interface component is further configured to receive a confirmation from a second data storage node of the plurality of data storage nodes that the second data storage node has replicated the modification to the at least one data element. In some embodiments, the snapshot component is further configured to identify a second snapshot from the plurality of snapshots as the committed snapshot responsive to receipt of the confirmation from the second data storage node. In some embodiments, the snapshot component is further to remove the first snapshot from the plurality of snapshots responsive to identifying the second snapshot as the committed snapshot.

In some embodiments, the first data storage node stores an operation log comprising a plurality of database operations performed on the first data storage node and wherein the command processing component is further configured to determine whether at least one entry in the operation log has been replicated by the majority of data storage nodes in the plurality of data storage nodes using the committed snapshot responsive to the write commit command not modifying the at least one data element in the first data storage node. In some embodiments, the command processing component is further configured to generate the write commit confirmation responsive to a determination that the majority of the plurality of data storage nodes replicated the at least one entry in the operation log. In some embodiments, the at least one entry in the operation log comprises a newest entry in the operation log that occurred before receipt of the write commit command.

In some embodiments, the interface component is further configured to receive a write command and wherein the command processing component is further configured to write data to the first data storage node responsive to receipt of the write command.

In some embodiments, the system further comprises a database including the plurality of data storage nodes and wherein the database follows an eventual consistency model. In some embodiments, the first data storage node is a primary data storage node and a remainder of the data storage nodes of the plurality of data storage nodes are secondary data storage nodes. In some embodiments, the first data storage node includes an operation log and a remainder of the data storage nodes of the plurality of data storage nodes are configured to retrieve the operation log and replicate operations in the operation log.

According to at least one aspect, a method of performing operations in a computer database is provided. The method comprises generating, by a snapshot component executed by at least one processor, a plurality of snapshots of data stored in a first data storage node of a plurality of data storage nodes; identifying, by the snapshot component executed by the at least one processor, a first snapshot from the plurality of snapshots that is representative of data that has been replicated on a majority of the plurality of data storage nodes as a committed snapshot; receiving, by an interface component executed by the at least one processor, a write commit command; determining, by a command processing component executed by the at least one processor, whether the write commit command modifies at least one data element in the first data storage node; responsive to the write commit command modifying the at least one data element in the first data storage node, modifying the at least one data element in the first data storage node based on the write commit command; determining whether the majority of the plurality of storage nodes have replicated the modification to the at least one data element using the committed snapshot; and generating a write commit confirmation responsive to a determination that the majority of the plurality of data storage nodes have replicated the modification to the at least one data element; and providing, by the interface component, the write commit confirmation.

In some embodiments, the method further comprises generating the write commit confirmation responsive to the write commit command not modifying the at least one data element in the first data storage node. In some embodiments, the method further comprises receiving a confirmation from a second data storage node of the plurality of data storage nodes that the second data storage node has replicated the modification to the at least one data element. In some embodiments, the method further comprises identifying a second snapshot from the plurality of snapshots as the committed snapshot responsive to receipt of the confirmation from the second data storage node.

In some embodiments, the first data storage node stores an operation log comprising a plurality of operations performed on the first data storage node and wherein the method further comprises determining whether at least one entry in the operation log has been replicated by the majority of data storage nodes in the plurality of data storage nodes using the committed snapshot responsive to the write commit command not modifying the at least one data element in the first data storage node. In some embodiments, the method further comprises generating the write commit confirmation responsive to a determination that the majority of the plurality of data storage nodes replicated the at least one entry in the operation log.

According to at least one aspect, a database system is provided. The database system comprises a database configured to follow an eventual consistency model and comprising a primary data storage node storing an operation log and a plurality of secondary data storage nodes configured to retrieve the operation log from the primary data storage node and replicate operations in the operation log; and at least one processor configured to execute a plurality of system components. The plurality of system components comprises an interface component configured to receive a write commit command and provide a write commit confirmation; a snapshot component configured to generate a plurality of snapshots of data stored in the primary data storage node, identify a first snapshot from the plurality of snapshots that is representative of data that has been replicated on a majority of the plurality of secondary data storage nodes as a committed snapshot, and identify a second snapshot from the plurality of snapshots as the committed snapshot responsive to one or more secondary data storages nodes replicating at least one operation in the operation log; and a command processing component configured to: determine whether the write commit command modifies at least one document in a primary data storage node; and responsive to the write commit command modifying the at least one document in the primary data storage node, modify the at least one document in the primary data storage node; determine whether the majority of the secondary storage nodes have replicated the modification to the at least one document in the primary data storage node using the committed snapshot; and generate the write commit confirmation responsive to a determination that the majority of the secondary storage nodes replicated the modification to the at least one document.

BRIEF DESCRIPTION OF THE DRAWINGS

Various aspects of at least one embodiment are discussed herein with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

FIG. 13 is a table showing the relationship between the snapshot view and the operation log view of data, according to some embodiments.

DETAILED DESCRIPTION

Figure 1:
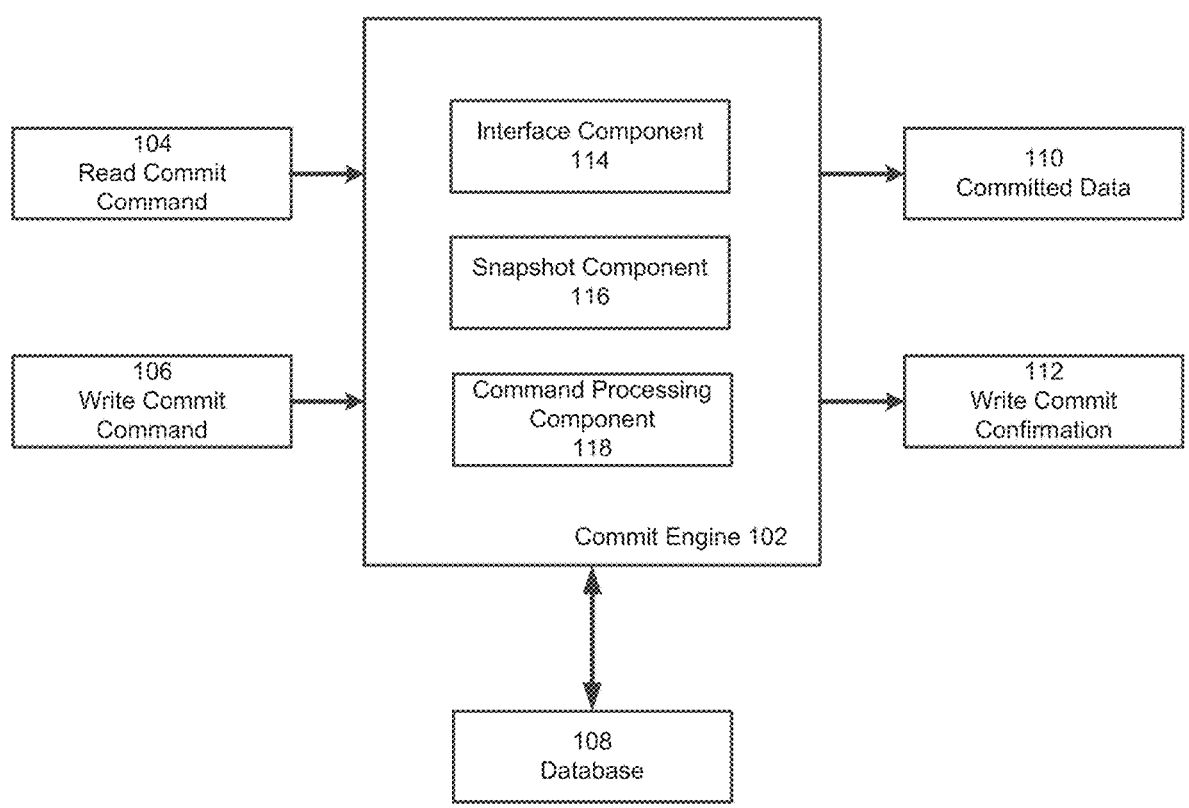
FIG. 1 illustrates a block diagram of an example commit engine configured to process read and write commit commands, according to some embodiments.

According to one aspect, systems and methods are provided for reading and writing committed data in a database. In some embodiments, the database may follow an eventual consistency model and committed data may be data that has been replicated by more than a predetermined number of secondary nodes (e.g., half the secondary nodes) in the database. In these embodiments, data may be replicated from a primary node in the database to secondary nodes in the database over time, and the database may contain many groups of primary and secondary nodes. Thereby, one or more of the secondary nodes may have data that is not completely up-to-date relative to a respective primary node. Further, a client sending a read request to the database may receive data from a secondary node that is not completely up-to-date. The systems, as described herein according to some embodiments, provide clients an ability to read only committed from the database. The term "read commit" may refer to the command to read committed data from the database. For example, users may provide command line or execution instructions to read only committed data. Thereby, the system provides the client a view of the data that is being provided by a majority of the secondary nodes in response to read requests. Further, the systems may provide clients an ability to write data to the database and receive a confirmation once the data is replicated on a sufficient number of nodes in the database so as to be committed. The term "write commit" may refer to such a command.

In some embodiments, the system may monitor the latest data that has been committed to the database through the generation and management of snapshots. Snapshots may be captured periodically (or aperiodically) and be representative of the state of the data in the database at a particular point in time. The system may identify a committed snapshot that is representative of committed data (e.g., replicated by a threshold number of nodes (e.g., majority of nodes)). These snapshots may advantageously simplify processing of read commit and/or write commit commands. For example, read commit commands may be processed by simply reading from the committed snapshot. Similarly, write commit commands may be performed by determining whether the operation(s) included in the write commit command is included in the committed snapshot and returning a confirmation one the operation(s) are included in the committed snapshot.

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Example Database Commit Engine

FIG. 1 shows an example commit engine 102 according to some embodiments. The commit engine 102 may be designed to process various received commands on a database 108. In some embodiments, the database 108 may include a plurality of nodes and replicate data from primary node to one or more secondary nodes. The primary and respective secondary nodes are configured to host at least a portion of the database data, and other replica sets (e.g., primary and respective secondary nodes) can host other portions. In these embodiments, the primary node may handle commands that change the data stored in the database and the secondary nodes may replicate the data in the primary node over time and process read requests. Thereby, the secondary nodes may have data that is not completely up-to-date relative to the primary nodes. Committed data may include data that has been replicated to at least a predetermined number of secondary nodes in the database (e.g., at least half of the secondary nodes).

In some embodiments, the commit engine 102 receives and processes read commit commands 104 and/or write commit commands 106. The commit engine 102 may process a read commit command 104 by identifying committed data in the database 108, processing a read request on the identified committed data, and providing the results as committed data 110. The commit engine 102 may process a write commit command 106 by writing data to the database 108 and providing a write commit confirmation 112 once the changes in the write to the database 108 have been committed.

As shown in FIG. 1, the commit engine 102 includes an interface component 114. The interface component 114 may be configured to receive and provide data to various systems, such as the database 108. In some embodiments, the interface component 114 receives the read commit command 104 and provides the committed data 110 once the read commit command 104 has been processed by the commit engine 102. The interface component 114 may also receive the write commit command 106 and provide the write commit confirmation 112 once the write commit command 106 has been processed by the commit engine 102.

The commit engine 102 may include a snapshot component 116 to generate snapshots of data in the database 108. The snapshots are illustrative of the data in the database 108 at a particular point in time (e.g., a unique point in time) on a logical clock. For example, the snapshot component 116 may generate a snapshot of the database 108 every 10 milliseconds (ms) and each snapshot may be representative of the data in the database 108 at the time the snapshot was taken. For example, the snapshots may be indicative of the data in a primary node and/or a secondary node or any replica set at a particular point in time. Thereby, the snapshots generated by the snapshot component 116 may provide a different view of the data in the database 108 that illustrates changes over time, and/or from node to node.

It should be appreciated that the snapshots may be captured at unique points in time on both a logical clock and a physical clock in cases where the time difference between the captured snapshots is larger than the resolution of the physical clock. For example, the snapshots may be captured every 10 ms and the resolution of the physical clock may be 1 ms. In this example, each of the snapshots may be generated at both a unique point in time on a logical clock and a unique point in time on the physical clock.

As described above, secondary nodes in the database 108 may include data that is not completely up-to-date relative to the primary node. Thereby, there is generally a delay between changes being made to the primary node and the changes being replicated in a requisite number of secondary nodes so as to be committed to the database 108. In some embodiments, the snapshot component 116 may identify a committed snapshot from the generated snapshots. In one example, the commit engine evaluates changes in state within the snapshots to determine if replication has occurred to a threshold number of nodes, if so the snapshot can be identified or labelled as a committed snapshot. In another example, a snapshot is only updated to include new data once the new data has been committed. Thus, in one implementation committed snapshots are only updated to include committed data.

A committed snapshot may be a latest snapshot of the database 108 that is representative of only committed data. Stated differently, the committed snapshot may be the most recent snapshot that only contains committed data. Further, the snapshot component 116 may update the snapshot that is the committed snapshot as the secondary nodes replicate changes made to the primary node. For example, the latest changes to the primary node that have been committed may be the changes made up to 12:30 pm on May 6, 2016. Subsequently, the secondary nodes may replicate data from the primary node and move the commit forward from 12:30 pm on May 6, 2016 to 2:00 pm on May 6, 2016. The snapshot component 116 may, in response, select a more recent snapshot as the committed snapshot and remove any snapshots that are older than the new committed snapshot. Thereby, the snapshot component 116 updates which snapshot is the committed snapshot in tandem with the secondary nodes in the database 108 replicating the data from the primary node.

The read commit commands 104 may be processed by a command processing component 118 of the commit engine 102. In some embodiments, the command processing component 118 may process read commit commands 104 by reading data from the committed snapshot generated and identified by the snapshot component 116. The particular method employed by the command processing component 118 to read from the committed snapshot may vary depending upon the particular implementation of the snapshot. For example, the snapshot may be a copy of the data and the command processing component 118 may read directly from the snapshot. In other examples, the snapshots may only be representative of operations made on the database to obtain data in the same state as the data in the database 108 at the time of the snapshot. In these examples, the command processing component 118 may identify a secondary node in the database 108 that has data stored in the same state as the committed snapshot and read from that secondary node. In some embodiments, each node may maintain a respective snapshot and reads can be distributed to secondary nodes based on respective snapshot information. It should be appreciated that the command processing component 118 may identify a secondary node in the database 108 that has data that deviates from the committed snapshot so long as the data relevant to the read request (e.g., the portion of the data being read) is in the same state as the committed snapshot. The results from the read performed by the command processing component 118 may be provided as the committed data 110 via the interface component 114.

The write commit commands 106 may also be processed by the command processing component 118. In some embodiments, the command processing component 118 may process the write commit commands 106 by writing the data to the primary node of the database 108 and waiting for a requisite number of secondary nodes (e.g., at least half of the secondary nodes) to have replicated the changes written to the primary node. The command processing component 118 may, in some implementations, expedite the process of replicating the changes by, for example, communicating with the secondary nodes to trigger replication of the changes. Once the changes have been replicated to a sufficient number of secondary nodes, the command processing component 118 may generate the write commit confirmation 112 that may be provided via the interface component 114.

It should be appreciated that, in some embodiments, the commit engine 102 may also be able to process regular read and/or write commands in addition to the read commit command 104 and the write commit command 106. For example, the command processing component 118 may read data from a secondary node in the database 108 and provide the result via the interface component 114 responsive to receipt of a read command. Similarly, the command processing component 118 may write data to a primary node in the database 108 in response to receipt of the write command.

Example Database Systems

Figure 2:
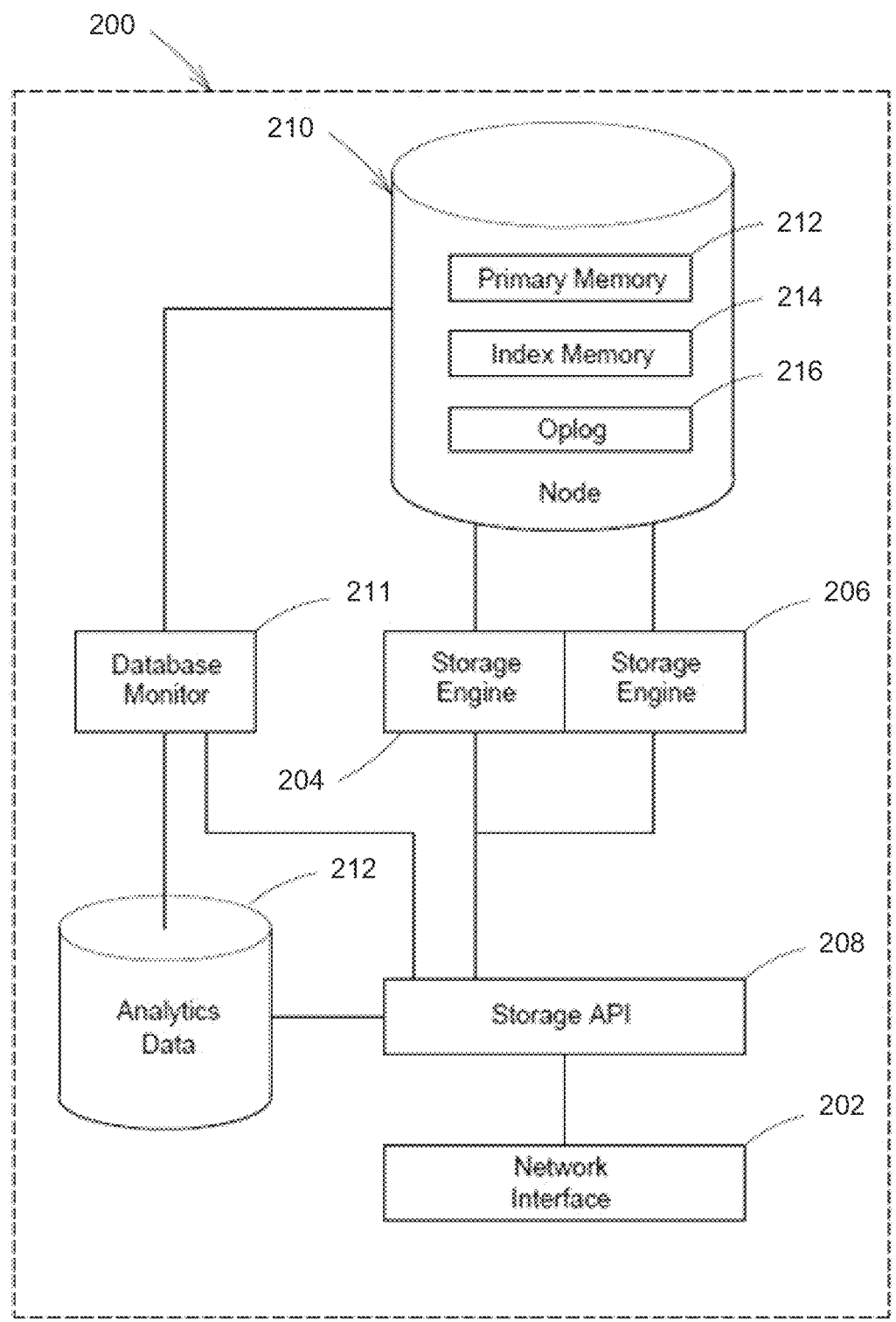
FIG. 2 illustrates a block diagram of an example distributed database system, according to some embodiments.

An example of a database subsystem 200 is shown in FIG. 2. The database subsystem 200 includes an interface 202 for sending and receiving information (including database requests and responses thereto) to router processes, database clients, or other components or entities in the system. In one embodiment, the backend architecture is configured to interact with any data model provided by a managed database. For example, the managed database can include a non-relational data model. In another embodiment, the data model can be implemented in the form of replica sets as described in U.S. patent application Ser. No. 12/977,563, which is hereby incorporated by reference in its entirety. The database subsystem 200 includes a storage application. In one implementation described in greater detail below, a base unit of data is a document.

In some embodiments, a storage application programming interface (API) 208 receives database requests, including requests to perform read and write operations. When a write operation is requested, the storage API 208 in response selectively triggers a first storage engine 204 or a second storage engine 206 configured to store data in a first data format or second data format, respectively, in node 210. As discussed in more detail below, a database monitor 211 may track a number of analytics about the database. In some embodiments, the database monitor 211 is configured to track the operations performed on the data over time, and stores that information as analytics data 213. In some examples, analytic data may be stored in a separate database. In other examples, the analytics data is stored as a name collection (i.e., a logical grouping of data). These analytics may be provided to the storage API 208, which relies on the analytics to selectively actuate an appropriate storage engine. In further embodiments, although multiple storage engines are provided, not all storage engines may operate with snapshots and/or not all storage engines may provide read commit (and/or write commit) functionality. Responsive to a command execution that includes read commit settings, the system may force use of a particular storage engine or alternatively provide error information that the current storage engine does not support the functionality. Thus, the system can be configured to check capability of storage engines to support read commit (and/or write commit) functions and report on the same to end users.

In one example, the database monitor 211 tracks the relative number of read and write operations performed on a collection within the database. In another example, the database monitor 211 is configured to track any operations (e.g., reads, writes, etc.) performed on any base unit of data (e.g., documents) in the database.

In some embodiments, the storage API 208 uses the tracked data (e.g., analytics data) collected by the database monitor 211 and/or the analytics data 213 to select an optimal storage engine for a database, a collection, or a document having the observed read/write ratio. In one example, the storage API 208 is mapped to the selected storage engine. For example, an identifier of the selected storage engine may be stored in a location in memory or on disk; when a write operation request is received by the storage API 208, the identifier is used to identify and activate the storage engine. Alternatively, elements of the database can specify a mapping or association with a storage engine that can be manually edited, edited through an administrative interface, or automatically changed responsive to system monitoring. In other embodiments, the database monitor 211 itself is configured to determine an optimal storage engine based on the analytics data 213 and other aspects of the data, for example, stored in the database, database collection, or in a document. This determination may be passed to the storage API 208, or otherwise used to map the storage API 208 to a determined storage engine.

The storage API 208 receives database write requests (e.g., from a database API (not shown)) via a network interface 202, and carries out the requested operations by selectively triggering one of the first storage engine 204 and the second storage engine 206. The first storage engine 204 and the second storage engine 206 are executable software modules configured to store database data in the data node 210 in a particular data format. For example, the first storage engine 204 may be configured to store data in a row-store format, and the second storage engine 206 may be configured to store data in a LSM-tree format. In one example, the first storage engine 204 and/or the second storage engine 206 are configured store primary database data (i.e., the data being stored and queried) in a particular data format in the primary data memory 212, and may store database index data in a particular data format in index data memory 214. In one embodiment, the first storage engine 204 and/or the second storage engine 206 are configured store an operation log (referred to as an "oplog") 216 in a particular data format. As discussed in more detail below, a database monitor 211 may track a number of analytics about the database, and the operations performed on it over time, and stores that information as analytics data 213.

One advantage of using the storage API 208 as an abstraction layer between the database API and the storage engines is that the identity and selection of a particular storage engine can be transparent to the database API and/or a user interacting with the database API. For example, the database API may pass a "write" function call to the storage API 208 instructing the storage API to write a particular set of data to the database. The storage API 108 then determines, according to its own analysis and/or user input, which storage engine should perform the write operation. Different storage engines may be appropriate for different types of data stored in different collections that may undergo a variety of different operations. Thus, the choice and implementation of calls to an appropriate storage engine are made by the API 208, freeing the database API calls to simply request a "write" of certain data. This abstraction level allows for the implementation of the system on large filesystems that may be stored across machines in a database cluster, such as the Hadoop Filesystem offered by the Apache Software Foundation.

Another advantage of using the storage API 208 is the ability to add, remove, or modify storage engines without modifying the requests being passed to the API 208. The storage API 208 is configured to identify the available storage engines and select the appropriate one based on one or more factors discussed below. The database API requesting write operations need not know the particulars of the storage engine selection or operation, meaning that storage engines may be embodied in pluggable modules that may be swapped out or modified. Thus, users are able to leverage the same query language, data model, scaling, security and operational tooling across different applications, each powered by different pluggable storage engines.

Figure 3:
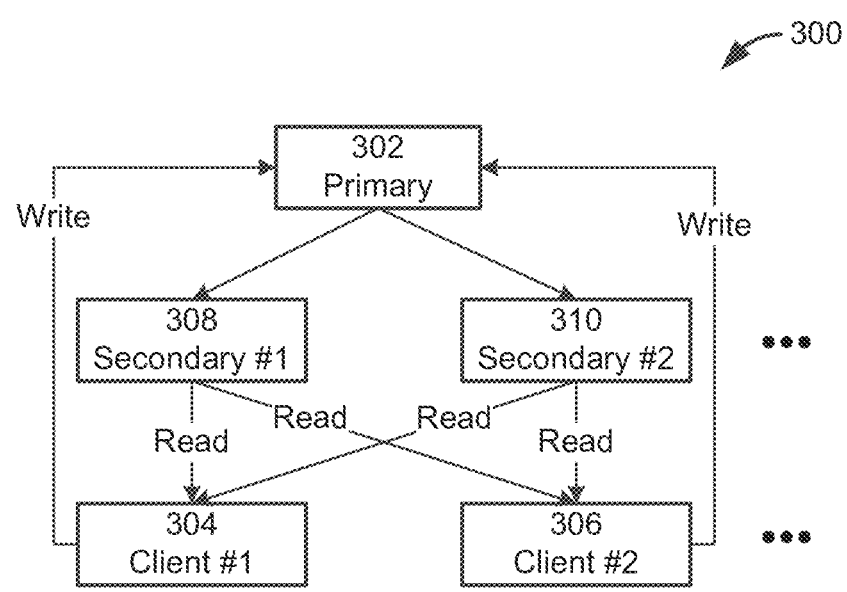
FIG. 3 illustrates a block diagram of an example replica set hosting a distributed database, according to some embodiments.

The embodiment shown and discussed with respect to FIG. 2 depicts a single database node 210. Yet in some embodiments, multiple database nodes may be provided and arranged in a replica set. FIG. 3 shows a block diagram of an exemplary replica set 300. Replica set 300 includes a primary node 302 and one or more secondary nodes 308 and 310, each of which is configured to store a dataset that has been inserted into the database. The primary node 302 may be configured to store all of the documents currently in the database, and may be considered and treated as the authoritative version of the database in the event that any conflicts or discrepancies arise, as will be discussed in more detail below. While two secondary nodes 308, 310 are depicted for illustrative purposes, any number of secondary nodes may be employed, depending on cost, complexity, and data availability requirements. In a preferred embodiment, one replica set may be implemented on a single server. In other embodiments, the nodes of the replica set may be spread among two or more servers.

The primary node 302 and secondary nodes 308, 310 may be configured to store data in any number of database formats or data structures as are known in the art. In a preferred embodiment, the primary node 302 is configured to store documents or other structures associated with non-relational databases. The embodiments discussed herein relate to documents of a document-based database, such as those offered by MongoDB, Inc. (of New York, N.Y. and Palo Alto, Calif.), but other data structures and arrangements are within the scope of the disclosure as well.

In some embodiments, the replica set primary node 302 only accepts write requests (disallowing read requests) from client systems 304, 306 and the secondary nodes 308, 310 only accept reads requests (disallowing write requests) from client systems 304, 306. In such embodiments, the primary node 302 receives and processes write requests against the database, and replicates the operation/transaction asynchronously throughout the system to the secondary nodes 308, 310. In one example, the primary node 302 receives and performs client write operations and generates an oplog.

Each logged operation is replicated to, and carried out by, each of the secondary nodes 308, 310, thereby bringing those secondary nodes into synchronization with the primary node 302. In some embodiments, the secondary nodes 308, 310 may query the primary node 302 to receive the operation log and identify operations that need to be replicated. In other embodiments, the operation log may be transmitted from the primary node 302 to the secondary nodes 308, 310 periodically or in response to the occurrence of a predefined condition, such as accruing a threshold number of operations in the operation log that have not yet been sent to the secondary nodes 308, 310. Other implementations can be configured to provide different levels of consistency, and, for example, by restricting read requests. According to one embodiment, read requests can be restricted to systems having up to date data, read requests can also in some settings be restricted to primary systems, among other options.

In some embodiments, both read operations may be permitted at any node (including primary node 302 or secondary nodes 308, 310) and write operations limited to primary nodes in response to requests from clients. The scalability of read operations can be achieved by adding nodes and database instances. In some embodiments, the primary node 302 and/or the secondary nodes 308, 310 are configured to respond to read operation requests by either performing the read operation at that node or by delegating the read request operation to another node (e.g., a particular secondary node 308). Such delegation may be performed based on load-balancing and traffic direction techniques. In other embodiments, read distribution can be managed based on a respective snapshot available at various nodes within a distributed database. For example, the system can determine based on analyzing client requested data what snapshot is associated with the requested data and what node hosts the respective data or snapshot that can be used to provide the requested data. In one example, a data routing processor accesses configuration files for respective replica sets to determine what node can respond to a data request, and further analysis of respective snapshots can determine, for example, what node within a replica set needs to be accessed.

In some embodiments, the primary node 302 and the secondary nodes 308, 310 may operate together to form a replica set 300 that achieves eventual consistency, meaning that replication of database changes to the secondary nodes 308, 310 may occur asynchronously. When write operations cease, all replica nodes of a database will eventually "converge," or become consistent. The eventually consistent model provides for a loose form of consistency. In one particular example, (assuming >3 secondary nodes) client systems (e.g. 304, 306) request write operations: W(x=3); W(x=7); W(x=5). As the replication of the write requests occurs asynchronously, at some point all of the secondary nodes (e.g. 308, 310) will respond to a read request with 5. However, in the short term (during replication operations) client systems randomly reading from secondary nodes can see [read operations designated by R (variable and actual value)]: R(x=7); R(x=0); R(x=5); and R(x=3). In such a configuration, replica set 300 provides eventual consistency and can permit out of order reads (in the short term). Other example implementations can increase the strength of consistency, and for example, can include monotonic read consistency (no out of order reads). Eventual consistency may be a desirable feature where high availability is important, such that locking records while an update is stored and propagated is not an option. In such embodiments, the secondary nodes 308, 310 may handle the bulk of the read operations made on the replica set 300, whereas the primary node 308, 310 handles the write operations. For read operations where a high level of accuracy is important (such as the operations involved in creating a secondary node), read operations may be performed against the primary node 302. In some embodiments, replica set 300 can be configured to perform according to a single writer eventually consistent model.

It will be appreciated that the difference between the primary node 302 and the one or more secondary nodes 308, 310 in a given replica set may be largely the designation itself and the resulting behavior of the node; the data, functionality, and configuration associated with the nodes may be largely identical, or capable of being identical (e.g., secondary nodes can be elevated to primary nodes in the event of failure). Thus, when one or more nodes within a replica set 300 fail or otherwise become available for read and/or write operations, other nodes may change roles to address the failure. For example, if the primary node 302 were to fail, a secondary node 308 may assume the responsibilities of the primary node, allowing operation of the replica set to continue through the outage. This failover functionality is described in U.S. application Ser. No. 12/977,563, the disclosure of which is hereby incorporated by reference in its entirety.

Each node in the replica set 300 may be implemented on one or more server systems. Additionally, one server system can host more than one node. Each server can be connected via a communication device to a network, for example the Internet, and each server can be configured to provide a heartbeat signal notifying the system that the server is up and reachable on the network. Sets of nodes and/or servers can be configured across wide area networks, local area networks, intranets, and can span various combinations of wide area, local area and/or private networks. Various communication architectures are contemplated for the sets of servers that host database instances and can include distributed computing architectures, peer networks, virtual systems, among other options.

The primary node 302 may be connected by a LAN, a WAN, or other connection to one or more of the secondary nodes 308, 310, which in turn may be connected to one or more other secondary nodes in the replica set 300. Connections between secondary nodes 308, 310 may allow the different secondary nodes to communicate with each other, for example, in the event that the primary node 302 fails or becomes unavailable and a secondary node must assume the role of the primary node.

According to one embodiment, a plurality of nodes (e.g., primary nodes and/or secondary nodes) can be organized in groups of nodes in which data is stored and replicated across the nodes of the set. Each group can be configured as a replica set. In another embodiment, one or more nodes are established as primary nodes that host a writable copy of the database. Each primary node can be responsible for a portion of the database, e.g. a database shard. Database sharding breaks up sections of the database into smaller portions based on, for example, ranges of the data. In some implementations, database sharding facilitates scaling a primary-secondary architecture over a large number of nodes and/or large database implementations. In one embodiment, each database shard has one primary node which replicates its data to its secondary nodes. Database shards can employ location preferences. For example, in a database that includes user records, the majority of accesses can come from specific locations. Migrating a shard primary node to be proximate to those requests can improve efficiency and response time. For example, if a shard for user profile includes address information, shards can be based on ranges within the user profiles, including address information. If the nodes hosting the shard and/or the shard primary node are located proximate to those addresses, improved efficiency can result, as one may observe the majority of requests for that information to come from locations proximate to the addresses within the shard.

Figure 4:
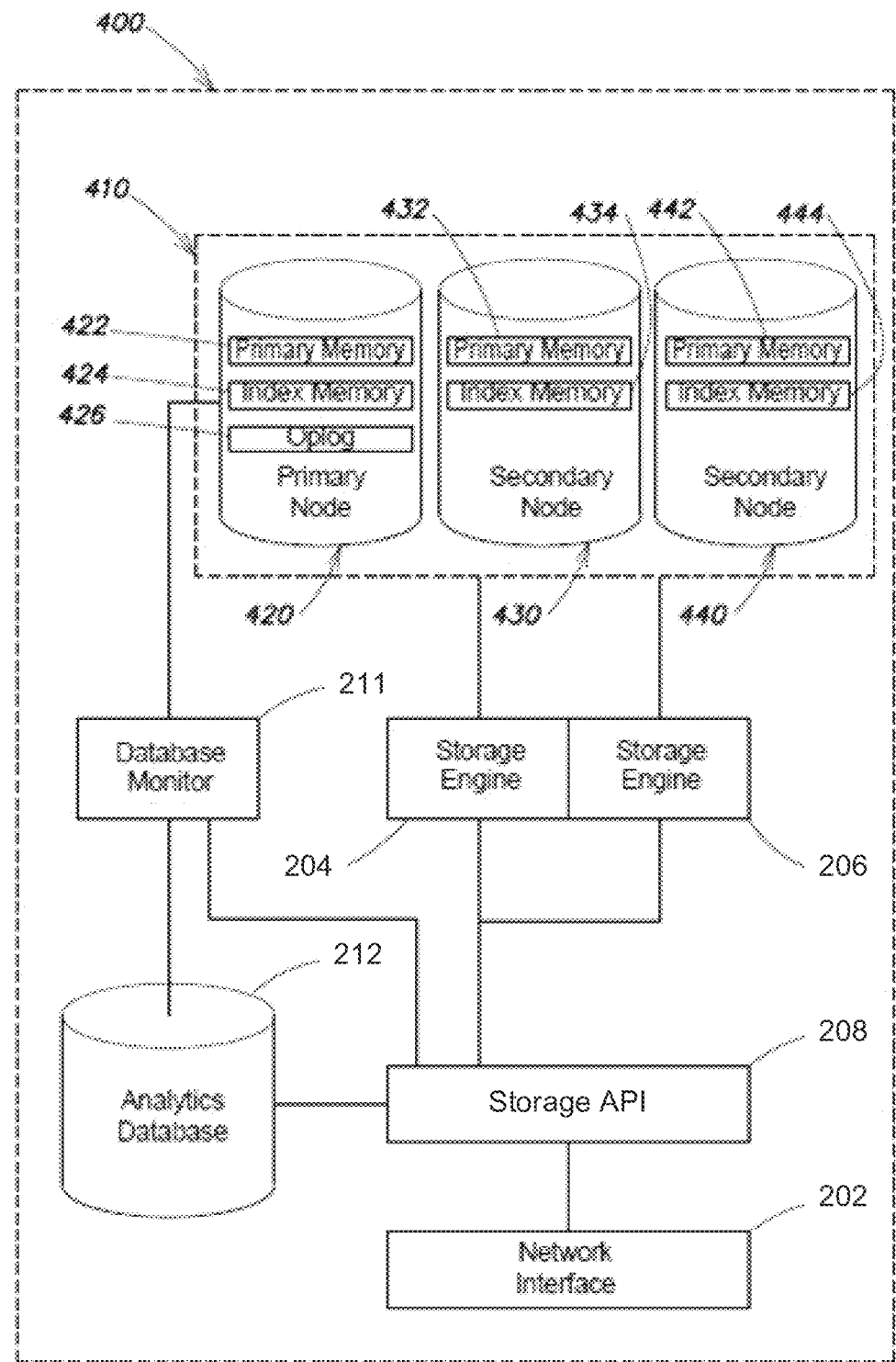
FIG. 4 illustrates a block diagram of another example distributed database system, according to some embodiments.

An example of a database subsystem 400 incorporating a replica set 410 is shown in FIG. 4. As can be seen, database subsystem 400 incorporates many of the elements of database subsystem 200 of FIG. 2 including the network interface 202, the storage engines 204, 206, the storage API 208, the database monitor 211, and the analytics database 212. Relative to the database subsystem 200 shown in FIG. 2, the database subsystem 400 replaces the single node 210 with a replica set 410 comprising primary node 420 and secondary nodes 430 and 440. In one example, the replica set 410 functions in much the same manner as the replica set 300 discussed with respect to FIG. 3. While only two secondary nodes 430 and 440 are shown for illustrative purposes, it will be appreciated that the number of secondary nodes may be scaled up or down as desired or necessary.

In one example, database operation requests directed to the replica set 410 may be processed by the primary node 420 and either performed by the primary node 420 or directed to a secondary node 430, 440 as appropriate. In one embodiment, both read and write operations are permitted at any node (including primary node 420 or secondary nodes 430, 440) in response to requests from clients. The scalability of read operations can be achieved by adding nodes and database instances. In some embodiments, the primary node 420 and/or the secondary nodes 430, 440 are configured to respond to read operation requests by either performing the read operation at that node or by delegating the read request operation to another node (e.g., a particular secondary node 430). Such delegation may be performed based on various load-balancing and traffic direction techniques.

In some embodiments, the database only allows write operations to be performed at the primary node 420, with the secondary nodes 430, 440 disallowing write operations. In such embodiments, the primary node 420 receives and processes write requests against the database, and replicates the operation/transaction asynchronously throughout the system to the secondary nodes 430, 440. In one example, the primary node 420 receives and performs client write operations and generates an oplog. Each logged operation is replicated to, and carried out by, each of the secondary nodes 430, 440, thereby bringing those secondary nodes into synchronization with the primary node 420 under an eventual-consistency model.

In one example, primary database data (i.e., the data being stored and queried) may be stored by one or more data storage engines in one or more data formats in the primary data memory 422, 432, 442 of nodes 420, 430, 440, respectively. Database index data may be stored by one or more data storage engines in one or more data formats in the index data memory 424, 434, 444 of nodes 420, 430, 440, respectively. Oplog data may be stored by a data storage engine in a data format in oplog data memory 426 of node 420.

Example Methods for Processing Read/Write Commit Commands

As discussed above, various systems may be configured to process read commit commands. The processing of these commands may be facilitated by the generation of snapshots of the database at different points in time on a logical clock.

Figure 5:
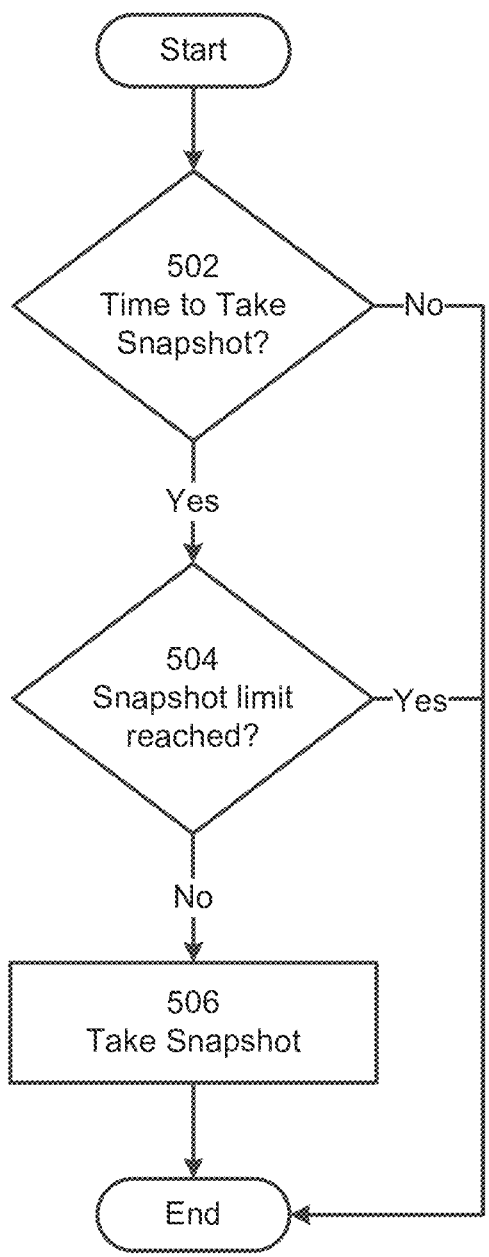
FIG. 5 is a flowchart showing an example snapshot generation process, according to some embodiments.

FIG. 5 shows an example snapshot generation process 500 according to some embodiments. The snapshot generation process 500 may be performed by a system (e.g., snapshot component 116 shown in FIG. 1) to generate snapshots of the data in the database that may be used to facilitate execution of read commit requests. In some embodiments, one or more storage nodes in a database may generate snapshots. For example, all of the storage nodes in a database may generate snapshots. Further, the storage nodes may generate snapshots of their own data (e.g., data in the respective storage node) and/or snapshots of data in another storage node (e.g., data in a primary storage node). As shown in FIG. 5, the snapshot generation process 500 includes an act 502 of determining whether it is time to take a snapshot, an act 504 of determining whether a snapshot limit has been reached, and an act 506 of taking a snapshot.

In act 502, the system determines whether it is time to take a snapshot. The system may make the determination as to whether it is appropriate to take a snapshot based on a predetermined policy. For example, the system may periodically or aperiodically capture snapshots of the data. In other examples, the system may change the timing of taking snapshots based on client interaction with the database. For example, the system may take snapshots every 10 milliseconds during time periods where the database is receiving change requests and pause snapshot generation during periods where no changes to the database are taking place. Thereby, the system may reduce the number of snapshots being taken and stored by avoiding multiple successive snapshots that do not include any changes to the database. If the system determines that it is an appropriate time to take a snapshot, the system proceeds to act 504 to determine whether a snapshot limit has been reached. Otherwise the snapshot generation process 500 ends.

In act 504, the system determines whether a snapshot limit has been reached. The system may have a predefined maximum number of snapshots that can be maintained at any given time. For example, the system may have a maximum number of snapshots of 10,000. If the snapshot limit has been reached, then process 500 ends. Otherwise, the system proceeds to act 506 and takes a snapshot.

Figure 6:
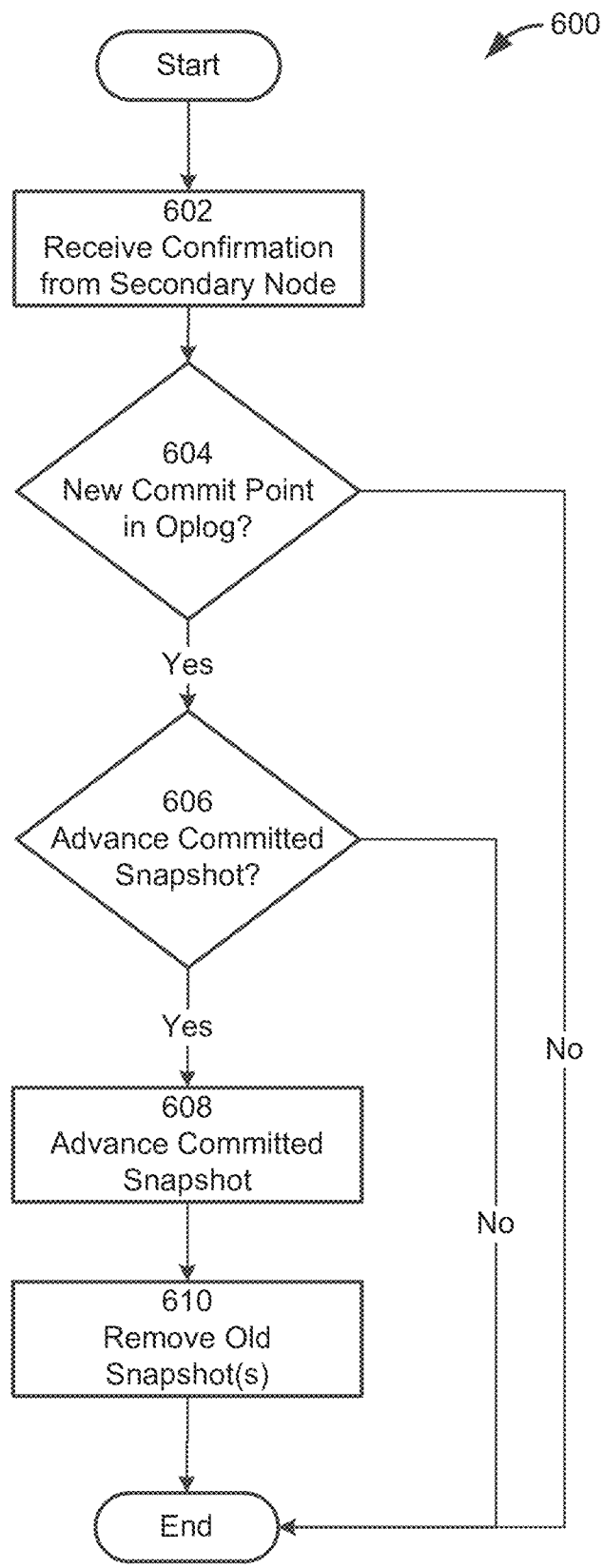
FIG. 6 is a flowchart showing an example snapshot commit process, according to some embodiments.

FIG. 6 shows an example snapshot commit process 600. A system (e.g., snapshot component 116 shown in FIG. 1) may perform the snapshot commit process 600 to continually update which snapshot is the latest committed snapshot and purge older snapshots. In some embodiments, one or more of the storage nodes that generate snapshots may perform process 600 to identify a committed snapshot. For example, all of the storage nodes may identify a committed snapshot. As shown in FIG. 6, the snapshot commit process 600 includes an act 602 of receiving confirmation from a secondary node, an act 604 of determining whether there is a new commit point in the operation log, an act 606 of determining whether to advance the committed snapshot, an act 608 of advancing the committed snapshot, and an act 610 of removing old snapshot(s).

In act 602, the system receives confirmation from a secondary node. The confirmation from the secondary node may indicate that a particular secondary node has performed various actions consistent with the operation log to make the data in that secondary node more up-to-date. The secondary node may provide the confirmation without explicit instructions from a primary node.

In act 604, the system determines whether there is a new commit point in the operation log. The system may determine whether there is a new commit point in the operation log by, for example, identifying the latest operation in the operation log that at least 50% of the secondary nodes have replicated. If the latest operation in the operation log is more up-to-date than the previous commit point, the commit point in the operation log advances. If the commit point in the operation log advances, the system proceeds to act 606 to determine whether the advance the committed snapshot. Otherwise the snapshot commit process 600 ends.

In act 606, the system determines whether to advance the committed snapshot based on the change in the commit point in the operation log. The system may determine whether to advance the committed snapshot by determining whether there is a more recent snapshot that only captures committed operations in the operation log. For example, the advance in the commit point in the operation log may be very small (e.g., 2 operations). In this example, the system may determine not to advance the snapshot by determining that the most recent snapshot that does not include any uncommitted operations (e.g., operations after the commit point in the operation log) is the same snapshot that has already been committed. In another example, the advance in the commit point in the operation log may be very large (e.g., 30 operations). In this example, the system may determine to advance the snapshot by determining that the most recent snapshot that does not include any uncommitted operations is the 10$^{th}$ snapshot after the previously committed snapshot. If the system determines that is appropriate to advance the committed snapshot, the system proceeds to act 608 and advances the committed snapshot (e.g., to the 10$^{th}$ snapshot). Otherwise the snapshot commit process 600 ends.

In act 608, the system advances the committed snapshot. The system may advance the committed snapshot by flagging or otherwise marking the identified snapshot as the committed snapshot.

In act 610, the system removes old snapshots. The old snapshots that may be removed may be the snapshots that are older than the new committed snapshot. For example, a previous committed snapshot may be removed.

Figure 12:
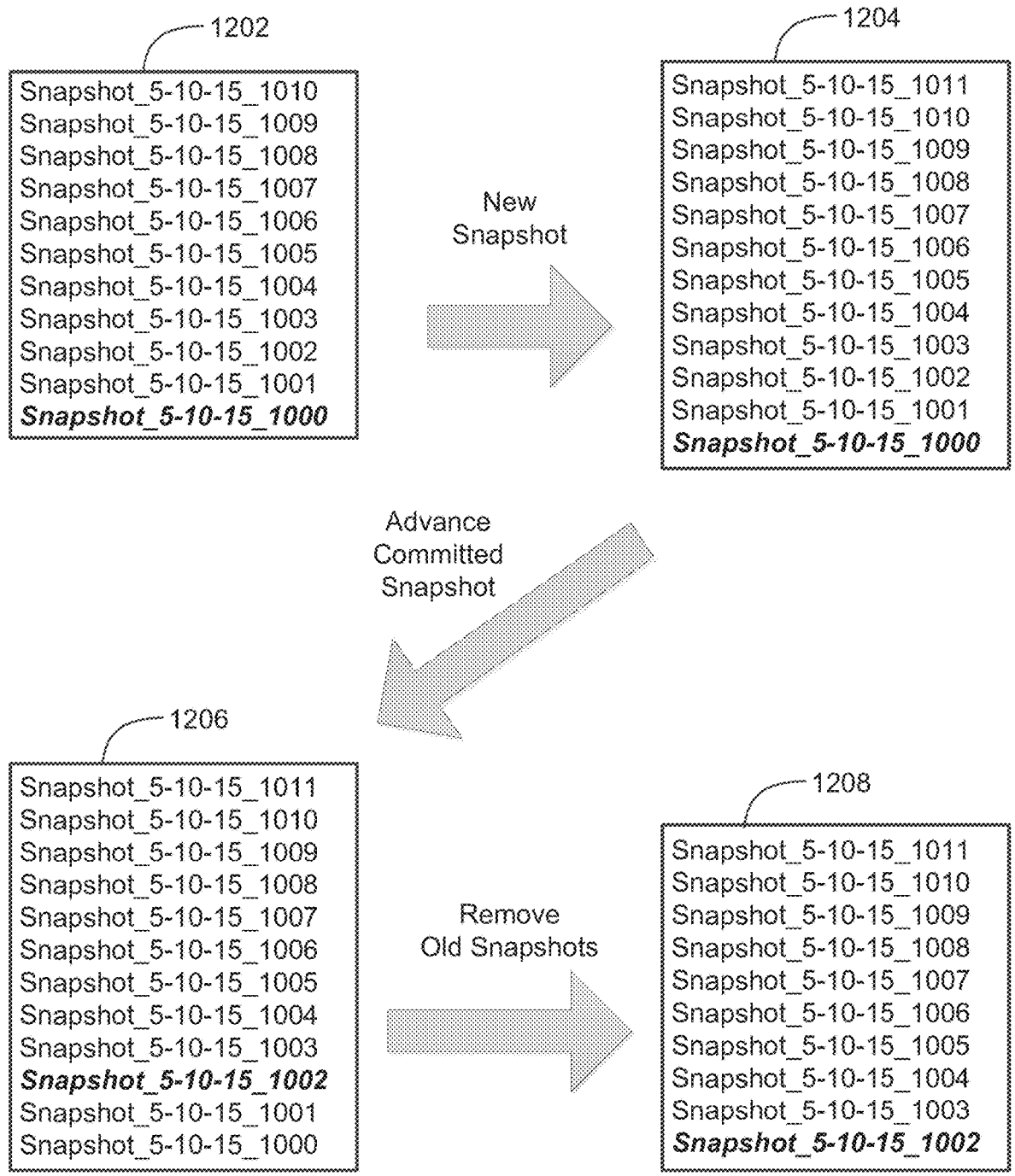
FIG. 12 is a state diagram showing the generation and maintenance of snapshots, according to some embodiments.

As discussed above, various processes may be performed by the system to generate and maintain the snapshots. FIG. 12 is a diagram showing the generation and maintenance of snapshots. A first collection of snapshots 1202 is shown in the top left section of the diagram. The first collection of snapshots 1202 includes a committed snapshot illustrated in bold (Snapshot_5-10-15_1000). A new snapshot (Snapshot_5-10-15_1011) is added to the first collection of snapshots 1202 to form a second collection of snapshots 1204. The committed snapshot in the second collection of snapshots 1204 is advanced (now Snapshot_5-10-15_1002) to form the third collection of snapshots 1206. The committed snapshot may advance responsive to a sufficient number of secondary nodes replicating the data in the new committed snapshot. The snapshots that are older than the new committed snapshot (Snapshot_5-10-15_1002) are removed from the third collection of snapshots 1206 to form the fourth collection of snapshots 1208. These old snapshots may be removed to limit the number of snapshots that need to be stored at any given time.

Each of the snapshots in the various snapshot collections may be representative of data stored at various points in time that may correspond to one or more actions in the operation log. Thereby, the snapshots create a new view of the data in the database that illustrates changes over discrete chunks of time as opposed to changes over operations performed (as shown by the operation log). FIG. 13 is a table showing the relationship between the snapshot view 1302 and the operation log view 1304 of data. As shown, the snapshot view 1302 includes three snapshots (Snapshot_5-10-15_1000, Snapshot_5-10-15_1001, and Snapshot_5-10-15_1002) ordered from oldest (at the top) to newest (at the bottom). Each of the three snapshots were taken at different points in time on a database receiving a sequence of write requests shown in the operation log view 1304. The requests are ordered from the oldest (at the top) to the newest (at the bottom). Each of the three snapshots corresponds to a specific point in time in the operation log and, thereby, a portion of the operation log. For example, Snapshot_5-10-15_1000 was taken just after the "Create VEGETABLE collection" operation was performed. Thereby, the data in the database at the time Snapshot_5-10-15_1000 was taken may be recreated by performing the "Create VEGETABLE collection" operation. The second snapshot (Snapshot_5-10-15_1001) was taken just after the "Insert BROCCOLI into VEGETABLE collection" operation was performed. Thereby, the data in the database at the time Snapshot_5-10-15_1001 was taken may be replicated by performing all of the operations prior to (and including) the "Insert BROCCOLI into VEGETABLE collection" operation. The third snapshot (Snapshot_5-10-15_1002) was taken just after the "Insert TOMATO into FRUIT collection" operation was performed. Thereby, the data in the database at the time Snapshot_5-10-15_1002 was taken may be replicated by performing all of the operations prior to (and including) the "Insert TOMATO into FRUIT collection" operation.

As shown in FIG. 13, a particular snapshot may be associated with more than one operations relative to the previous snapshot. For example, the third snapshot (Snapshot_5-10-15_1002) is associated with four additional operations relative to the second snapshot (Snapshot_5-10-15_1001). Further, operations may be performed after the latest snapshot (Snapshot_5-10-15_1002) has been taken as shown by the last two operations in the operation log view 1304. These two operations may be captured in the next snapshot to be captured (e.g., Snapshot_5-10-15_1003).

Figure 7:
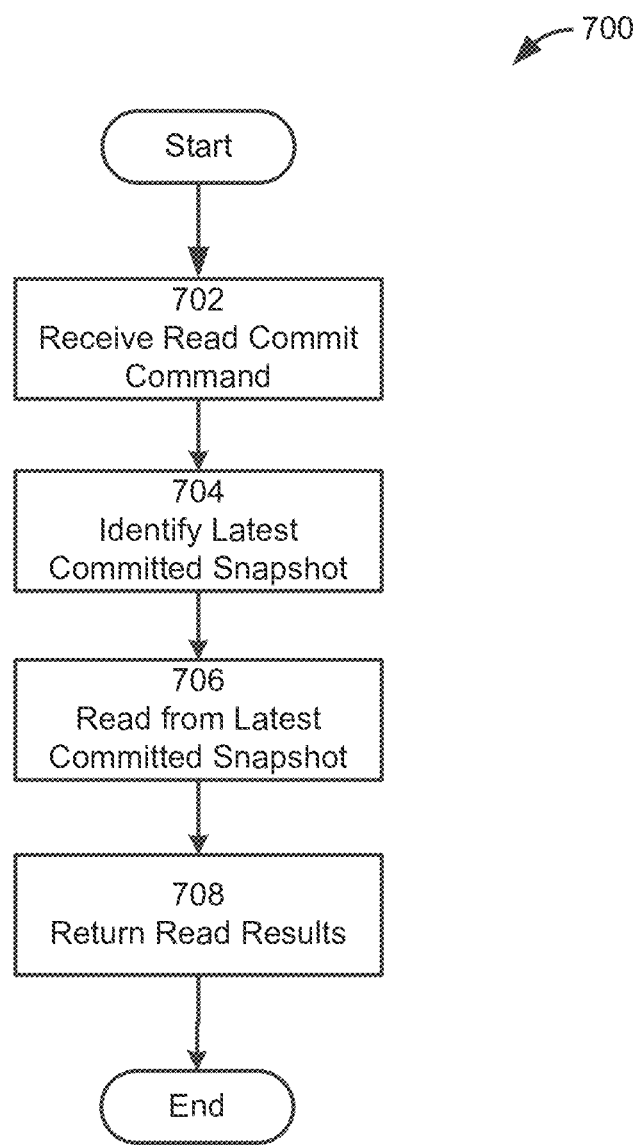
FIG. 7 is a flowchart showing an example read commit process, according to some embodiments.

As discussed above, the generation and maintenance of snapshots may facilitate the system to process read commit commands. FIG. 7 shows an example read commit process 700 that leverages the generated snapshots. The read commit process 700 may be performed by a system (e.g., a command processing component 118) to process read commit commands received from, for example, client. In some embodiments, a storage node (e.g., a primary or secondary storage node) that receives a read commit request may perform the read commit process 700. As shown in FIG. 7, the read commit process 700 includes an act 702 of receiving a read commit command, an act 704 of identifying the latest committed snapshot, an act 706 of reading from the latest committed snapshot, and an act 708 of returning the read results.

In some embodiments, read requests are permitted against uncommitted data by default. In one example, if no read commit parameter is specified in a data command, the system is configured to process against any available node and data. Whereas, if a read commit parameter is specified the system is configured to perform a read commit process, such as read commit process 700. For example, the system may determine where to access and return committed data.

In act 702, the system receives a read commit command. The read commit command may identify, for example, particular collections or documents that should be read.

In act 704, the system identifies the latest committed snapshot. The latest snapshot may be flagged or otherwise marked by, for example, the snapshot advance process 600 described above with reference to FIG. 6.

In act 706, the system reads from the latest committed snapshot. It should be appreciated that the particular method employed to read from the latest committed snapshot may vary depending upon the particular implementation of the snapshot employed. For example, the snapshot may not include data from the database but rather include a set of operations that have been performed (e.g., a section of the operation log). In this example the system may identify an appropriate secondary node to read that has the relevant data to be read in the same state as the committed snapshot. In other examples, the snapshot may store a copy of the data in the database. The snapshot may be stored in, for example, the primary storage node and/or any combination of one or more storage nodes. In these examples the system may directly read from the latest committed snapshot. In act 708, the system returns the data from the committed snapshot.

Figure 8A:
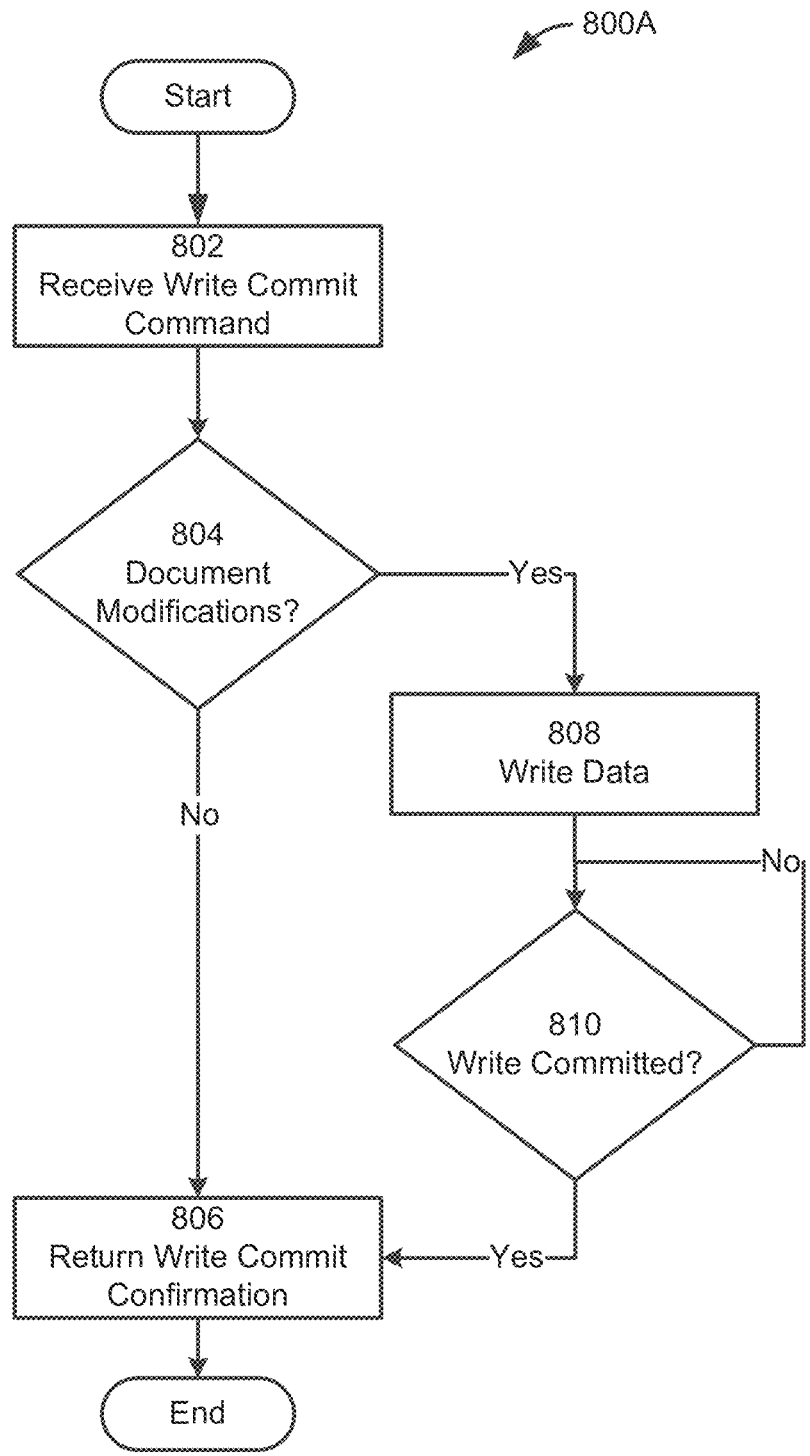
FIGS. 8A and 8B are flowcharts showing example write commit processes, according to some embodiments.

As discussed above, the generation and maintenance of snapshots may facilitate the system to process write commit commands. FIG. 8A illustrates an example write commit process 800A. The write commit process 800A described an example set of acts that may be performed by a system (e.g., command processing component 118 shown in FIG. 1) when a write commit command is received. In some embodiments, the write commit process 800A may be performed by, for example, a storage node that receives a write commit command (such as a primary storage node). It should be appreciated that, in some database models, only one data storage node (e.g., the primary storage node) may receive write and/or write commit requests. As shown in FIG. 8A, the process 800A includes the acts of: receiving a write commit command 802, determining whether a document is being modified 804, returning a write commit confirmation 806, writing data 808, and determining whether the write was committed 810.

In some embodiments, write requests (without a confirmation) are permitted by default (sometimes called "fire and forget write requests"). In one example, if no write commit parameter is specified in a data command, the system is configured to process the write command as a write request and not issue a confirmation once the write is committed. Whereas, if a write commit parameter is specified the system may be configured to perform a write commit process, such as write commit process 800A.

In act 802, the system receives a write commit command. The write commit command may include various document modifications that need to be performed by the system.

In act 804, the system determines whether the received write commit command includes any data element (e.g., document) modifications. Write commit commands may fail to make any document modifications for a variety of reasons. For example, a write commit command may request the addition of an entry to documents that do not already contain the entry. In this example, the write commit command may not have to make any document modifications if all of the documents already contain the entries. In these circumstances, the system may, for example, analyze data in the primary node of the database to determine whether any document modifications are necessary. If no document modifications are necessary, the system proceeds to act 806 and returns a write commit confirmation. Otherwise, the system proceeds to act 808 to write the data.

In act 808, the system writes the appropriate data to the primary and/or secondary nodes based on the requested changes in the write commit command. In some embodiments, the system may write the data by writing the data to the primary node and adding the appropriate operations to the oplog for the secondary nodes to perform. The system may also send explicit commands to all (or a portion) of the secondary nodes to reduce the time required for a sufficient number of secondary nodes to replicate the changes in the oplog.

In act 810, the system determines whether the write was committed. In some embodiments, the system may determine whether a write was committed using the committed snapshot. For example, the system may determine whether the operation(s) in the write commit command are included in the committed snapshot. If the operation(s) are included in the committed snapshot, the system may determine that the write has been committed. Otherwise, the system may determine that the write has not been committed. Additionally (or alternatively), the system may determine whether a write was committed based on a number of confirmations received from secondary nodes indicating that the operations added to the oplog in act 808 have been completed. For example, the system may have 11 secondary nodes and the system may determine that the write was committed once at least 6 confirmations have been received from secondary nodes. If the write has been committed, the system proceeds to act 806 and returns a write commit confirmation. Otherwise, the system repeats act 810 until the write has been committed.

Figure 8B:
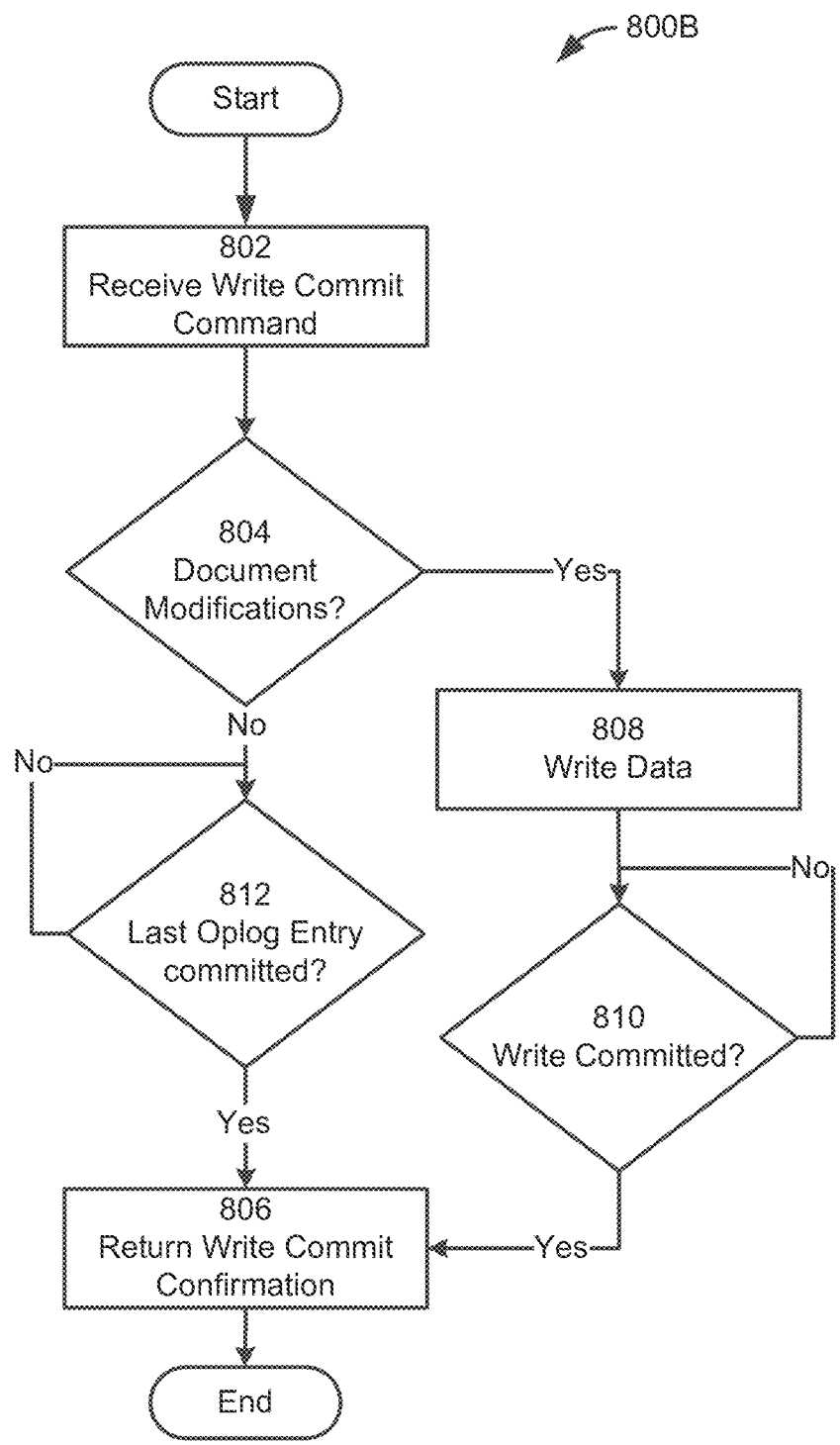

It should be appreciated that various alterations may be made to the write-commit process 800A without departing from the scope of this disclosure. For example, the system may wait for the last oplog entry to be committed before returning a write commit confirmation regardless of the write commit command received. The write commit process 800B in FIG. 8B illustrates such an example process. As shown, the write commit process 800B adds an act 812 of determining whether the last oplog entry was committed in cases where the system determines that the write commit command does not modify documents in act 804.

In act 812, the system determines whether one or more oplog entries have been committed. For example, the system may determine whether the latest oplog entry that occurred before the write commit command was made has been committed. In another example, the system may determine whether the oplog entry that made the data in the primary data storage node consistent with the change requested in the write commit command has been committed. If the oplog entry has been committed, the system proceeds to act 806 and returns a write commit confirmation. Otherwise, the system repeats act 812. The determination of whether the last oplog entry has been committed in act 812 may be performed in a similar fashion to the determination of whether the write was committed in act 810 described above. For example, the system may wait for a sufficient number of confirmations from secondary nodes that have replicated the latest oplog entry so as to commit the last oplog entry.

Example Special-Purpose Computer System

A special-purpose computer system can be specially configured as disclosed herein. According to one embodiment the special-purpose computer system is configured to perform any of the described operations and/or algorithms. The operations and/or algorithms described herein can also be encoded as software executing on hardware that defines a processing component, that can define portions of a special purpose computer, reside on an individual special-purpose computer, and/or reside on multiple special-purpose computers.

Figure 9:
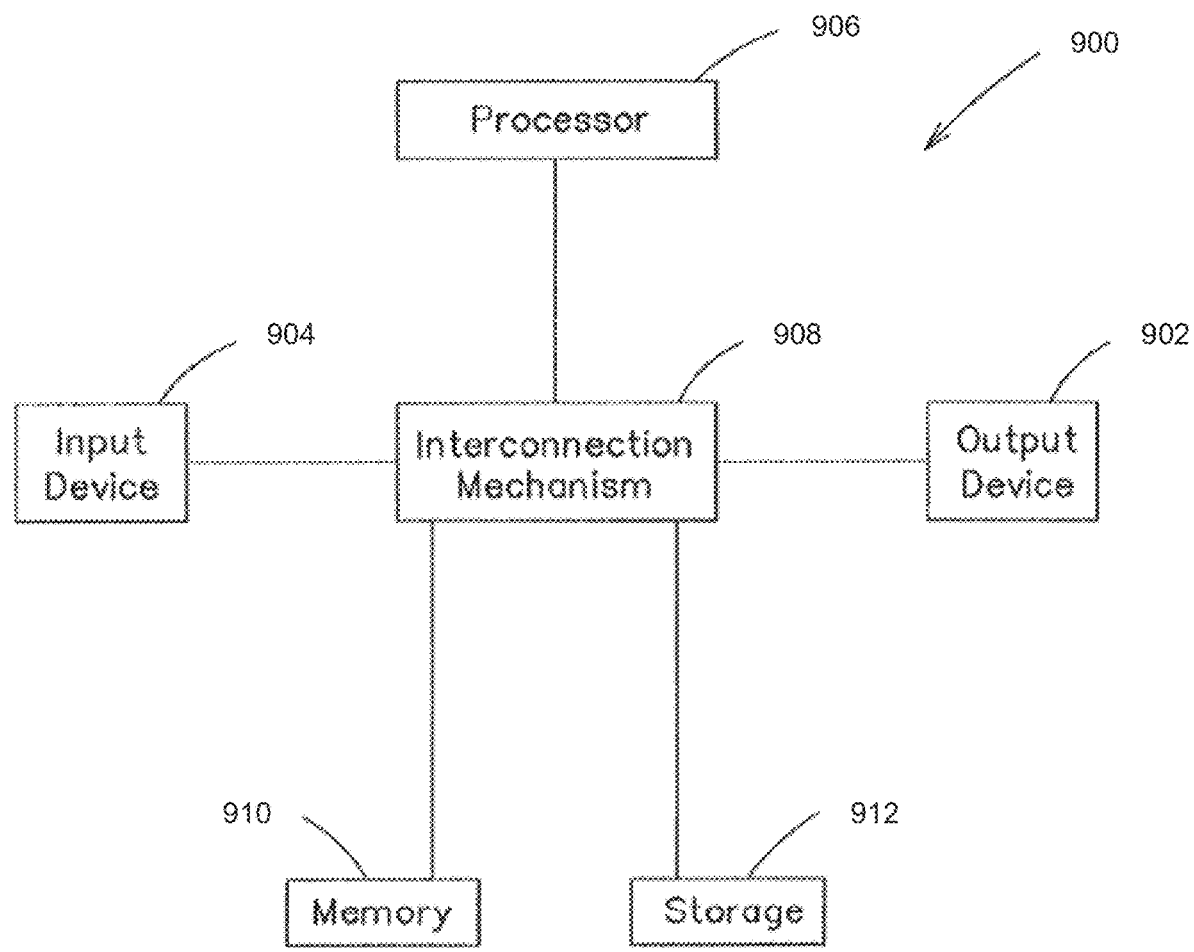
FIG. 9 is a block diagram of an example special-purpose computer system, according to some embodiments.

FIG. 9 shows a block diagram of an example special-purpose computer system 900 on which various aspects of the present invention can be practiced. For example, computer system 900 may include a processor 906 connected to one or more memory devices 910, such as a disk drive, memory, or other device for storing data. Memory 910 is typically used for storing programs and data during operation of the computer system 900. Components of computer system 900 can be coupled by an interconnection mechanism 908, which may include one or more busses (e.g., between components that are integrated within a same machine) and/or a network (e.g., between components that reside on separate discrete machines). The interconnection mechanism enables communications (e.g., data, instructions) to be exchanged between system components of system 900.

Computer system 900 may also include one or more input/output (I/O) devices 902-904, for example, a keyboard, mouse, trackball, microphone, touch screen, a printing device, display screen, speaker, etc. Storage 912, typically includes a computer readable and writeable nonvolatile recording medium in which computer executable instructions are stored that define a program to be executed by the processor or information stored on or in the medium to be processed by the program.

Figure 10:
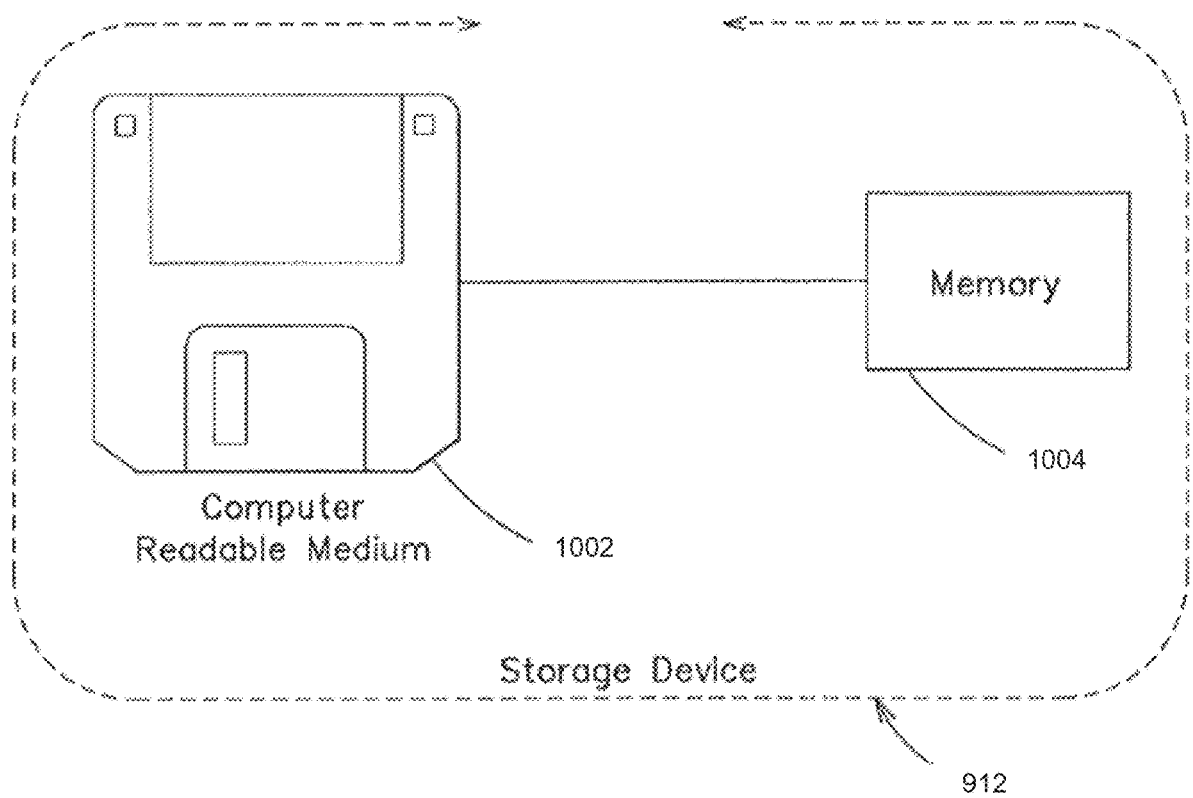
FIG. 10 is a block diagram of an example disk or flash memory, according to some embodiments.

The medium can, for example, be a disk 1002 or flash memory as shown in FIG. 10. Typically, in operation, the processor causes data to be read from the nonvolatile recording medium into another memory 1004 that allows for faster access to the information by the processor than does the medium. This memory is typically a volatile, random access memory such as a dynamic random access memory (DRAM) or static memory (SRAM). According to one embodiment, the computer-readable medium comprises a non-transient storage medium on which computer executable instructions are retained.

Referring again to FIG. 9, the memory can be located in storage 912 as shown, or in memory system 910. The processor 906 generally manipulates the data within the memory 910, and then copies the data to the medium associated with storage 912 after processing is completed. A variety of mechanisms are known for managing data movement between the medium and integrated circuit memory element and the invention is not limited thereto. The invention is not limited to a particular memory system or storage system.

The computer system may include specially-programmed, special-purpose hardware, for example, an application-specific integrated circuit (ASIC). Aspects of the invention can be implemented in software, hardware or firmware, or any combination thereof. Although computer system 900 is shown by way of example, as one type of computer system upon which various aspects of the invention can be practiced, it should be appreciated that aspects of the invention are not limited to being implemented on the computer system as shown in FIG. 9. Various aspects of the invention can be practiced on one or more computers having a different architectures or components than that shown in FIG. 9.

It should be appreciated that the invention is not limited to executing on any particular system or group of systems. Also, it should be appreciated that the invention is not limited to any particular distributed architecture, network, or communication protocol.

Various embodiments of the invention can be programmed using an object-oriented programming language, such as Java, C++, Ada, or C# (C-Sharp). Other programming languages may also be used. Alternatively, functional, scripting, and/or logical programming languages can be used. Various aspects of the invention can be implemented in a non-programmed environment (e.g., documents created in HTML, XML or other format that, when viewed in a window of a browser program, render aspects of a graphical-user interface (GUI) or perform other functions). The system libraries of the programming languages are incorporated herein by reference. Various aspects of the invention can be implemented as programmed or non-programmed elements, or any combination thereof.

Figure 11:
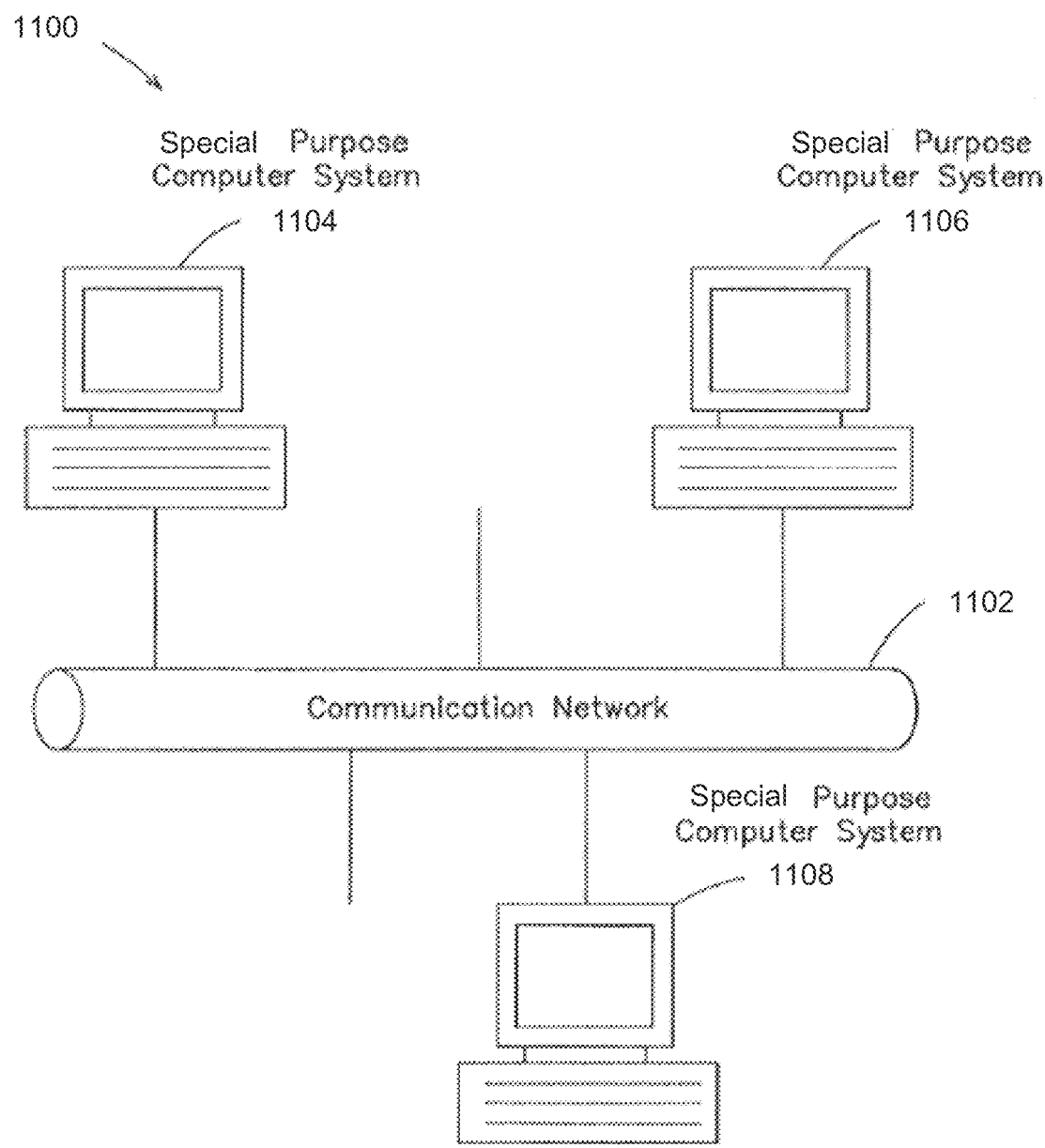
FIG. 11 is a block diagram of an example a distributed system, according to some embodiments.

Various aspects of this invention can be implemented by one or more systems similar to system 1100 shown in FIG. 11. For instance, the system can be a distributed system (e.g., client server, multi-tier system) that includes multiple special-purpose computer systems. In one example, the system includes software processes executing on a system associated with hosting database services, processing operations received from client computer systems, interfacing with APIs, receiving and processing client database requests, routing database requests, routing targeted database request, routing global database requests, determining global a request is necessary, determining a targeted request is possible, verifying database operations, managing data distribution, replicating database data, migrating database data, identifying committed data, etc. These systems can also permit client systems to request database operations transparently, with various routing processes handling and processing requests for data as a single interface, where the routing processes can manage data retrieval from database partitions, merge responses, and return results as appropriate to the client, among other operations.

There can be other computer systems that perform functions such as hosting replicas of database data, with each server hosting database partitions implemented as a replica set, among other functions. These systems can be distributed among a communication system such as the Internet. One such distributed network, as discussed below with respect to FIG. 11, can be used to implement various aspects of the invention. Various replication protocols can be implemented, and in some embodiments, different replication protocols can be implemented, with the data stored in the database replication under one model, e.g., asynchronous replication of a replica set, with metadata servers controlling updating and replication of database metadata under a stricter consistency model, e.g., requiring two phase commit operations for updates.

FIG. 11 shows an architecture diagram of an example distributed system 1100 suitable for implementing various aspects of the invention. It should be appreciated that FIG. 11 is used for illustration purposes only, and that other architectures can be used to facilitate one or more aspects of the invention.

System 1100 may include one or more specially configured special-purpose computer systems 1104, 1106, and 1108 distributed among a network 1102 such as, for example, the Internet. Such systems may cooperate to perform functions related to hosting a partitioned database, managing database metadata, monitoring distribution of database partitions, monitoring size of partitions, splitting partitions as necessary, migrating partitions as necessary, identifying sequentially keyed collections, optimizing migration, splitting, and rebalancing for collections with sequential keying architectures.

CONCLUSION

Having thus described several aspects and embodiments of this invention, it is to be appreciated that various alterations, modifications and improvements will readily occur to those skilled in the art. Such alterations, modifications, and improvements are intended to be part of this disclosure, and are intended to be within the spirit and scope of the invention. Accordingly, the foregoing description is by way of example only.

Use of ordinal terms such as "first," "second," "third," "a," "b," "c," etc., in the claims to modify or otherwise identify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A database system comprising:
   at least one processor configured to execute a plurality of system components, wherein the plurality of system components comprise:
   an interface component configured to receive a write commit command and provide a write commit confirmation;
   a snapshot component configured to:
      generate a plurality of snapshots of data stored in a first data storage node of a plurality of data storage nodes, wherein the first data storage node stores an operation log comprising a plurality of database operations performed on the first data storage node; and
      identify a first snapshot from the plurality of snapshots that is representative of data that has been replicated on a majority of the plurality of data storage nodes as a committed snapshot; and
   a command processing component configured to:
      determine whether the write commit command modifies at least one data element in the first data storage node; and
      responsive to the write commit command not modifying the at least one data element in the first data storage node:
         determine whether at least one entry in the operation log has been replicated by the majority of data storage nodes in the plurality of data storage nodes using the committed snapshot; and
         generate the write commit confirmation responsive to determining that the at least one entry in the operation log in the first data storage node has been replicated by the majority of data storage nodes in the plurality of data storage nodes.

2. The system of claim 1, wherein the command processing component is further to send a command to at least one data storage node in the plurality of data storage nodes to replicate the modification of the at least one data element in the first data storage node responsive to modifying the at least one data element in the first data storage node.

3. The system of claim 1, wherein the interface component is further configured to receive a confirmation from a second data storage node of the plurality of data storage nodes that the second data storage node has replicated the modification to the at least one data element.

4. The system of claim 3, wherein the snapshot component is further configured to identify a second snapshot from the plurality of snapshots as the committed snapshot responsive to receipt of the confirmation from the second data storage node.

5. The system of claim 4, wherein the snapshot component is further to remove the first snapshot from the plurality of snapshots responsive to identifying the second snapshot as the committed snapshot.

6. The system of claim 1, wherein the command processing component is configured to, responsive to the write commit command modifying the at least one data element in the first data storage node:
   modify the at least one data element in the first data storage node based on the write commit command;
   determine whether the majority of the plurality of storage nodes have replicated the modification to the at least one data element using the committed snapshot; and
   generate the write commit confirmation responsive to a determination that the majority of the plurality of data storage nodes have replicated the modification to the at least one data element.

7. The system of claim 6, wherein the command processing component is further configured to generate the write commit confirmation responsive to a determination that the majority of the plurality of data storage nodes replicated the at least one entry in the operation log.

8. The system of claim 6, wherein the at least one entry in the operation log comprises a newest entry in the operation log that occurred before receipt of the write commit command.

9. The system of claim 1, wherein the interface component is further configured to receive a write command and wherein the command processing component is further configured to write data to the first data storage node responsive to receipt of the write command.

10. The system of claim 1, further comprising a database including the plurality of data storage nodes and wherein the database follows an eventual consistency model.

11. The system of claim 10, wherein the first data storage node is a primary data storage node and a remainder of the data storage nodes of the plurality of data storage nodes are secondary data storage nodes.

12. The system of claim 10, wherein the first data storage node includes an operation log and a remainder of the data storage nodes of the plurality of data storage nodes are configured to retrieve the operation log and replicate operations in the operation log.

13. A method of performing operations in a computer database, comprising:
   generating, by a snapshot component executed by at least one processor, a plurality of snapshots of data stored in a first data storage node of a plurality of data storage nodes, wherein the first data storage node stores an operation log comprising a plurality of database operations performed on the first data storage node;
   identifying, by the snapshot component executed by the at least one processor, a first snapshot from the plurality of snapshots that is representative of data that has been replicated on a majority of the plurality of data storage nodes as a committed snapshot;
   receiving, by an interface component executed by the at least one processor, a write commit command and providing, by the interface component, a write commit confirmation;
   determining, by a command processing component executed by the at least one processor, whether the write commit command modifies at least one data element in the first data storage node;
   responsive to the write commit command not modifying the at least one data element in the first data storage node:

determining whether at least one entry in the operation log has been replicated by the majority of data storage nodes in the plurality of data storage nodes using the committed snapshot; and generating the write commit confirmation responsive to determining that the at least one entry in the operation log in the first data storage has been replicated by the majority of data storage nodes in the plurality of data storage nodes.

14. The method of claim 13, further comprising receiving a confirmation from a second data storage node of the plurality of data storage nodes that the second data storage node has replicated the modification to the at least one data element.

15. The method of claim 14, further comprising identifying a second snapshot from the plurality of snapshots as the committed snapshot responsive to receipt of the confirmation from the second data storage node.

16. The method of claim 13, further comprising, responsive to the write commit command modifying the at least one data element in the first data storage node:

modify the at least one data element in the first data storage node based on the write commit command;

determine whether the majority of the plurality of storage nodes have replicated the modification to the at least one data element using the committed snapshot; and generate the write commit confirmation responsive to a determination that the majority of the plurality of data storage nodes have replicated the modification to the at least one data element.

17. The method of claim 16, further comprising generating the write commit confirmation responsive to a determination that the majority of the plurality of data storage nodes replicated the at least one entry in the operation log.

18. A database system comprising:

a database configured to follow an eventual consistency model and comprising a primary data storage node storing an operation log and a plurality of secondary data storage nodes configured to retrieve the operation log from the primary data storage node and replicate operations in the operation log; and at least one processor configured to execute a plurality of system components, wherein the plurality of system components comprise:

an interface component configured to receive a write commit command and provide a write commit confirmation;

a snapshot component configured to:

generate a plurality of snapshots of data stored in the primary data storage node, wherein the primary data storage node stores an operation log comprising a plurality of database operations performed on the primary data storage node; and identify a first snapshot from the plurality of snapshots that is representative of data that has been replicated on a majority of the plurality of secondary data storage nodes as a committed snapshot; and identify a second snapshot from the plurality of snapshots as the committed snapshot responsive to one or more secondary data storages nodes replicating at least one operation in the operation log; and a command processing component configured to:

determine whether the write commit command modifies at least one document in the primary data storage node; and responsive to the write commit command not modifying the at least one document in the primary data storage node:

determine whether at least one entry in the operation log has been replicated by the majority of data storage nodes in the plurality of data storage nodes using the committed snapshot; and generate the write commit confirmation responsive to determining that the at least one entry in the operation log in the primary data storage has been replicated by the majority of data storage nodes in the plurality of secondary data storage nodes.

* * * * *